(12) United States Patent
Shin et al.

(10) Patent No.: US 11,630,724 B2
(45) Date of Patent: Apr. 18, 2023

(54) MEMORY CONTROLLER INCLUDING ECC CIRCUIT, MEMORY SYSTEM HAVING THE SAME, AND METHOD OF OPERATING MEMORY SYSTEM AND MEMORY CONTROLLER

(71) Applicant: Samsung Electronics Co., Ltd., Suwon-si (KR)

(72) Inventors: Beom-kyu Shin, Seongnam-si (KR); Sung-kyu Park, Seoul (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 0 days.

(21) Appl. No.: 17/318,643

(22) Filed: May 12, 2021

(65) Prior Publication Data

US 2021/0263794 A1 Aug. 26, 2021

Related U.S. Application Data

(63) Continuation of application No. 16/407,881, filed on May 9, 2019, now Pat. No. 11,036,577.

(30) Foreign Application Priority Data

Nov. 13, 2018 (KR) ........................ 10-2018-0139398

(51) Int. Cl.
*G06F 11/10* (2006.01)
*G06F 3/06* (2006.01)
*G06F 11/30* (2006.01)

(52) U.S. Cl.
CPC ........ *G06F 11/1048* (2013.01); *G06F 3/0614* (2013.01); *G06F 3/0658* (2013.01); *G06F 3/0673* (2013.01); *G06F 11/3037* (2013.01)

(58) Field of Classification Search
CPC .. G06F 11/1048; G06F 3/0673; G06F 3/0614; G06F 11/3037; G06F 3/0658
See application file for complete search history.

(56) References Cited

U.S. PATENT DOCUMENTS

| | | |
|---|---|---|
| 8,020,060 B2 | 9/2011 | Murin |
| 8,312,341 B1 | 11/2012 | Varnica et al. |
| 8,407,517 B2 | 3/2013 | Kawaguchi et al. |
| 9,058,880 B2 | 6/2015 | Ueng et al. |
| 9,588,841 B2 | 3/2017 | Lei et al. |
| 9,792,990 B2 | 10/2017 | Kim et al. |

(Continued)

FOREIGN PATENT DOCUMENTS

WO WO-2016/003828 A1 1/2016

*Primary Examiner* — Thien Nguyen
(74) *Attorney, Agent, or Firm* — Harness, Dickey & Pierce, P.L.C.

(57) ABSTRACT

Provided are a memory controller with improved data reliability, a memory system including the memory controller, and a method of operating the memory controller. The memory controller includes an error correction code (ECC) circuit configured to perform an error detection on a codeword read from a memory device; and a processor configured to set at least one memory chip from among a plurality of memory chips as an indicator chip, monitor an error occurrence in the indicator chip based on a result of the error detection, and output reliability deterioration information indicating that the reliability of the memory device is deteriorated based on a result of the monitoring.

15 Claims, 16 Drawing Sheets

(56) References Cited

U.S. PATENT DOCUMENTS

| | | |
|---|---|---|
| 2014/0122973 A1 | 5/2014 | Motwani |
| 2016/0170682 A1* | 6/2016 | Bakshi ................. G06F 3/0688 711/103 |
| 2016/0328284 A1* | 11/2016 | Healy ..................... G06F 12/00 |
| 2017/0091028 A1* | 3/2017 | Golan ..................... G11C 29/44 |
| 2018/0225173 A1 | 8/2018 | Baek et al. |

* cited by examiner

MEMORY CONTROLLER INCLUDING ECC CIRCUIT, MEMORY SYSTEM HAVING THE SAME, AND METHOD OF OPERATING MEMORY SYSTEM AND MEMORY CONTROLLER

CROSS-REFERENCE TO RELATED APPLICATION

This application is a continuation of U.S. application Ser. No. 16/407,881, filed May 9, 2019, and claims the benefit of Korean Patent Application No. 10-2018-0139398, filed on Nov. 13, 2018, in the Korean Intellectual Property Office, the disclosure of each of which is incorporated herein in its entirety by reference.

BACKGROUND

The inventive concepts relate to a memory controller, and more particularly, to a memory controller having improved data reliability, a memory system including the same, and a method of operating the memory controller.

As non-volatile memory devices, a flash memory and resistive memories like phase change RAM (PRAM), a nano floating gate memory (NFGM), polymer RAM (PoRAM), magnetic RAM (MRAM), ferroelectric RAM (FeRAM), and resistive RAM (RRAM) are known. A resistive memory has non-volatile characteristics of flash memory having high speed characteristics of dynamic random access memory (DRAM).

The lifespan of a resistive memory may be shortened as a write cycle and/or an erase cycle increase. In this case, reliability thereof may be deteriorated as data is not be written to the resistive memory or data stored in the resistive memory is lost. In the case where data is lost while a resistive memory is being used, the performance of an entire system employing the resistive memory may be deteriorated.

SUMMARY

The inventive concepts provide a memory controller capable of reducing the possibility of data loss and/or improving data reliability, a memory system including the memory controller, and a method of operating the memory controller.

According to an aspect of the inventive concepts, there is provided a memory controller including an error correction code (ECC) circuit configured to perform an error detection on a codeword read from the memory device; and a processor configured to set at least one memory chip from among the plurality of memory chips as an indicator chip, monitor an error occurrence in the indicator chip based on a result of the error detection, and output reliability deterioration information indicating that reliability of the memory device is deteriorated based on a result of the monitoring.

According to another aspect of the inventive concepts, there is a memory system including a memory module including a plurality of memory chips mounted on a module board; and a memory controller configured to control a memory operation for the plurality of memory chips of the memory module, set at least one memory chip from among the plurality of memory chips as an indicator chip, and, when it is determined based on a result of an error detection for a codeword read from the memory module that an error has occurred in the indicator chip, output reliability deterioration information indicating that reliability of the memory module is deteriorated.

According to another aspect of the inventive concepts, there is a method of operating a memory controller, the method including setting at least one memory chip from among a plurality of memory chips as an indicator chip; monitoring an error occurrence in the indicator chip based on a result of an error detection for a codeword read from a memory device; and outputting reliability deterioration information indicating that the reliability of the memory device is deteriorated when an error occurs in the indicator chip.

BRIEF DESCRIPTION OF THE DRAWINGS

Embodiments of the inventive concepts will be more clearly understood from the following detailed description taken in conjunction with the accompanying drawings in which.

DETAILED DESCRIPTION OF EXAMPLE EMBODIMENTS

Figure 1:
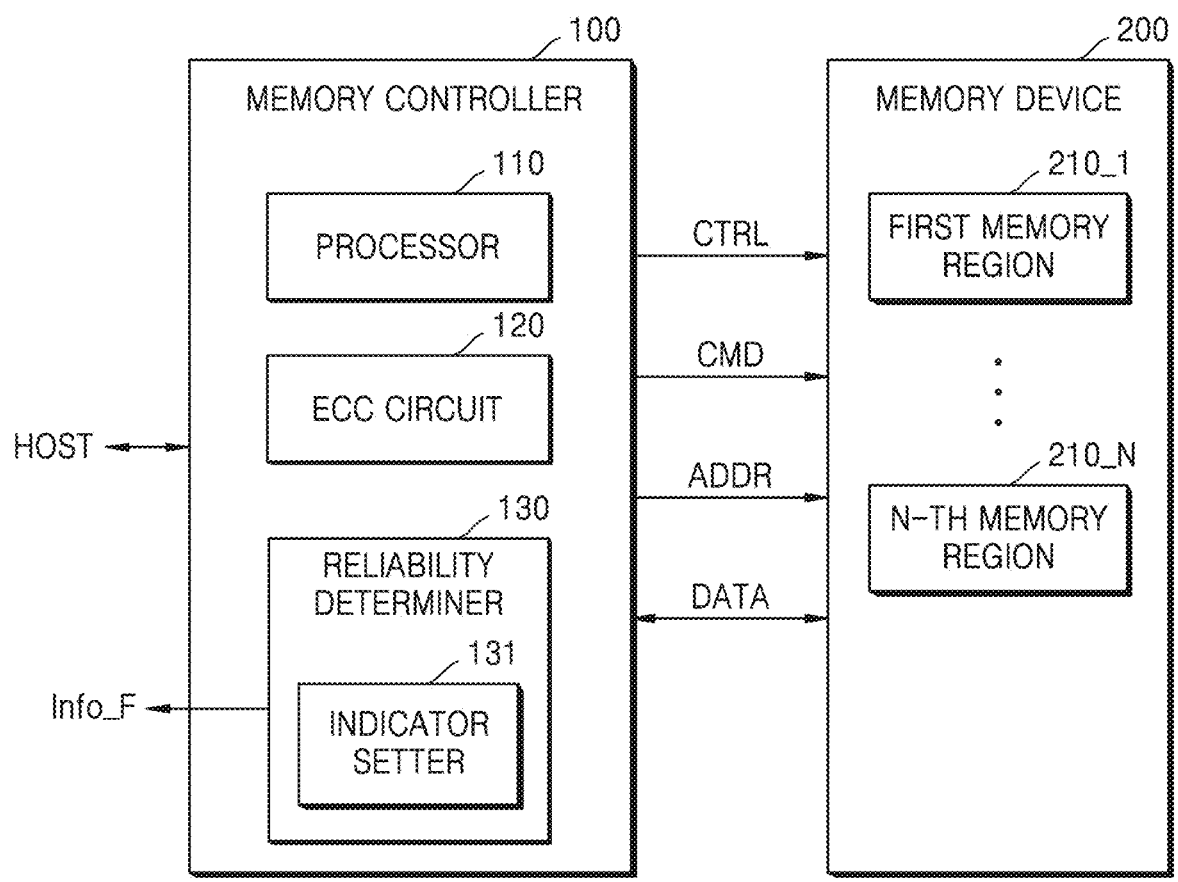
FIG. 1 is a block diagram showing a memory system including a memory device according to an example embodiment.

FIG. 1 is a block diagram showing a memory system including a memory device according to an example embodiment. In an example embodiment, a memory device 200 may be referred to as a resistive memory device as the memory device 200 includes resistive memory cells. Alternatively, in an example embodiment, the memory device 200 may include various types of memory cells. As the memory cells are arranged in a region where a plurality of first signal lines and a plurality of second signal lines cross each other, the memory device 200 may be referred to as a cross-point memory device. In example embodiments below, it will be assumed that the memory device 200 is a resistive memory device. However, example embodiments may be applied to various types of memory devices of which reliability may be deteriorated as the write and/or erase cycles increase. For example, example embodiments may be applied to various types of memory devices like a volatile memory device and a flash memory device.

The memory device 200 in FIG. 1 may be implemented in various forms. For example, the memory device 200 may be a device implemented as a single memory chip. Alternatively, the memory device 200 may be defined as a device including a plurality of memory chips.

Referring to FIG. 1, a memory system 10 may include a memory controller 100 and the memory device 200. The memory device 200 may include a plurality of memory regions, e.g., first to N-th memory regions 210_1 to 210_N. The memory controller 100 may control memory operations for the first to N-th memory regions 210_1 to 210_N. For example, a certain unit of data may be written to the first to N-th memory regions 210_1 to 210_N in a distributed manner or a certain unit of data may be read from the first to N-th memory regions 210_1 to 210_N.

According to an example embodiment, the memory device 200 includes a plurality of memory chips, and each of the first to N-th memory regions 210_1 to 210_N may correspond to a memory chip. Each memory chip may include a memory cell array for storing data and peripheral circuits (not shown) for performing memory operations, e.g., a write/read circuit and a control logic.

According to example embodiments, the memory device 200 may include a memory module in which a plurality of memory chips are mounted on a module board. Alternatively, the memory device 200 may include a semiconductor package including a plurality of memory chips, the memory chips may be stacked in a die form within the semiconductor package, and each of the first to N-th memory regions 210_1 to 210_N may be a memory chip included in the semiconductor package.

Alternatively, the memory device 200 may include one semiconductor chip including a plurality of semiconductor layers. At this time, each of the first to N-th memory regions 210_1 to 210_N may be a semiconductor layer. Alternatively, when the memory device 200 includes one semiconductor layer and the semiconductor layer includes a memory cell array including a plurality of cell blocks, each of the first to N-th memory regions 210_1 to 210_N may be a cell block.

The memory controller 100 may include a processor 110, an error correction code (ECC) circuit 120, and/or a reliability determiner 130. Based on the control of the processor 110, the memory controller 100 may control memory operations using a scheme based on hardware, software, and combinations thereof.

The memory controller 100 may control the memory device 200 to read data stored in the memory device 200 or write data to the memory device 200 in response to a write/read request from a host. In detail, the memory controller 100 may provide an address ADDR, a command CMD, and/or a control signal CTRL to the memory device 200, thereby controlling a program (or write) operation, a read operation, and an erase operation for the memory device 200. Also, data DATA to be written and data DATA read out may be transmitted and received between the memory controller 100 and the memory device 200.

Although not shown, the memory controller 100 may include RAM, a host interface, and/or a memory interface. The RAM may be used as an operation memory of the processor 110. The processor 110 may control all operations of the memory controller 100. The host interface may include a protocol for performing data exchange between the host and the memory controller 100. For example, the memory controller 100 may be configured to communicate with an external device (e.g., a host) via various interface protocols like USB, MMC, PCI-E, advanced technology attachment (ATA), serial-ATA, parallel-ATA, SCSI, ESDI, and integrated drive electronics (IDE).

Each of the first to N-th memory regions 210_1 to 210_N may include a plurality of memory cells (not shown) respectively disposed in regions where a plurality of first signal lines and a plurality of second signal lines cross each other. According to an example embodiment, the first signal lines may be a plurality of bit lines, and the second signal lines may be a plurality of word lines. Each of the memory cells may be single level cells (SLC) each storing data of one bit or multi level cells (MLC) each storing data of at least 2 bits.

When one bit of data is written to one memory cell, memory cells may have two resistance distributions according to written data. Alternatively, when two bits of data are written to one memory cell, memory cells may have four resistance distributions according to written data. In another embodiment, in the case of triple level cells (TLC) in which three bits of data are stored in one memory cell, memory cells may have eight resistance distributions according to written data. However, the inventive concepts are not limited thereto. In another embodiment, memory cells may include memory cells each capable of storing four or more bits of data.

The first to N-th memory regions 210_1 to 210_N may include resistive memory cells respectively including variable resistive elements (not shown). For example, when the variable resistive element is a phase change material (GST, Ge—Sb—Te) and the resistance thereof varies according to temperatures, the resistive memory device may be PRAM. In another example, the resistive memory device may be RRAM when the variable resistive element includes a top electrode, a bottom electrode, and a complex metal oxide therebetween. In another example, when the variable resistive element includes an upper electrode having a magnetic body, a lower electrode having a magnetic body, and a dielectric therebetween, the resistive memory device may be MRAM.

The memory controller 100 may include the ECC circuit 120 for performing error detection and correction operations on data read from the memory device 200 and may provide error-corrected read data to the host. According to an example embodiment, the ECC circuit 120 may generate parity data through ECC encoding processing using normal data from the host, wherein the normal data and the parity data may constitute a codeword. In other words, the memory controller 100 may perform data writing and reading operations in units of codewords. In below embodiments, the terms data DATA and codeword may be used interchangeably.

According to an example embodiment, the reliability determiner 130 may determine the possibility of reliability degradation of the memory device 200 and output reliability deterioration information Info_F according to a result of the determination. For example, the reliability determiner 130 may include an indicator setter 131, and the indicator setter 131 may be configured to set a memory region with relatively low reliability (or short lifespan) from among the first to N-th memory regions 210_1 to 210_N as an indicator.

Assuming that a first memory region is set as an indicator, data DATA read from the first memory region having a relatively short lifespan is more likely to be error-prone than data DATA read from other memory regions. For example, an error may first occur in the data DATA read from the first memory region before an error occurs in the data DATA read from the other memory regions. The reliability determiner 130 monitors the occurrence of errors in the data DATA read from the first memory region and may output reliability deterioration information Info_F indicating that the reliability of the memory device 200 is deteriorated (or the lifespan of the memory device 200 has ended) according to a result of the monitoring.

For example, the reliability determiner 130 may output the reliability deterioration information Info_F by monitoring an error occurrence rate or a bit error rate (BER) of the data DATA read from the first memory region. For example, the reliability determiner 130 may output the reliability deterioration information Info_F when an error occurs in the data DATA read from the first memory region. Alternatively, the reliability determiner 130 may count the number of errors of the data DATA read from the first memory region and output the reliability deterioration information Info_F according to whether an error occurring frequency exceeds a certain reference value. Alternatively, the reliability determiner 130 may output the reliability deterioration information Info_F when the number of errors occurring in the data DATA of a certain size read from the first memory region exceeds a reference number. Alternatively, the reliability determiner 130 may compare the error occurring frequency of the data DATA read from the first memory region with those of the other memory regions and output the reliability deterioration information Info_F based on a result of the comparison.

From among the first to N-th memory regions 210_1 to 210_N, an indicator may be set in various ways. For example, the reliability of each of the first to N-th memory regions 210_1 to 210_N may be measured through a test process during a fabrication process, and information indicating the reliability (e.g., lifespan information) may be stored in the memory device 200. The memory controller 100 may set at least one memory region having relatively low reliability from among the first to N-th memory regions 210_1 to 210_N as an indicator based on the lifespan information provided from the memory device 200. Alternatively, the memory controller 100 may determine a relatively unreliable memory region from among the first to N-th memory regions 210_1 to 210_N by controlling the memory device 200, or the memory controller 100 may artificially deteriorate the reliability of any of the first to N-th memory regions 210_1 to 210_N. In addition, at least one memory region from among the first to N-th memory regions 210_1 to 210_N may be set as an indicator through various methods.

For example, when the memory device 200 is a device including a plurality of memory chips, at least one memory chip may be set as an indicator, and the memory chip set as the indicator may be referred to as an indicator chip.

The memory controller 100 may predict the possibility that actual data may actually be lost from the memory device 200 and provide the reliability deterioration information Info_F to the host HOST before data may be actually lost. Accordingly, information indicating the need to replace the memory device 200 may be provided to a user at an appropriate time.

In the above-described embodiment, deterioration of the reliability of the memory device 200 may be described as a degradation or failure of the durability of the memory device 200, and thus it may be described that the memory controller 100 monitors error occurrences of an indicator chip and outputs endurance failure information.

According to an example embodiment, a possibility of data loss may be predicted in a memory device (e.g., a resistive memory) in which sudden data loss may occur as a writing and/or erasing cycle is performed and informed to a host, and thus data reliability may be improved. In addition, a method of counting the number of writing and/or erasing operations may be used as a method of determining the reliability of a plurality of memory regions of the memory device 200. According to an example embodiment, it is not necessary to provide a counter used for determining the lifespans of the memory regions, and thus an increase in area or an increase in power consumption due to implementation of the counter may be prevented.

The memory controller 100 and the memory device 200 may be implemented as separate semiconductor devices. Alternatively, the memory controller 100 and the memory device 200 may be integrated into one semiconductor device. For example, the memory controller 100 and the memory device 200 may be integrated into a single semiconductor device and constitute a memory card. For example, the memory controller 100 and the memory device 200 may be integrated into a single semiconductor device and constitute a PC card (PCMCIA), a compact flash card (CF), a smart media card (SM/SMC), a memory stick, multimedia cards (e.g., MMC, RS-MMC, MMCmicro, etc.), SD cards (e.g., SD, miniSD, microSD, etc.), a universal flash memory (I/FS), etc. In another example, the memory controller 100 and the memory device 200 may be integrated into a single semiconductor device and constitute a solid state disk/drive (SSD).

Figure 2A:
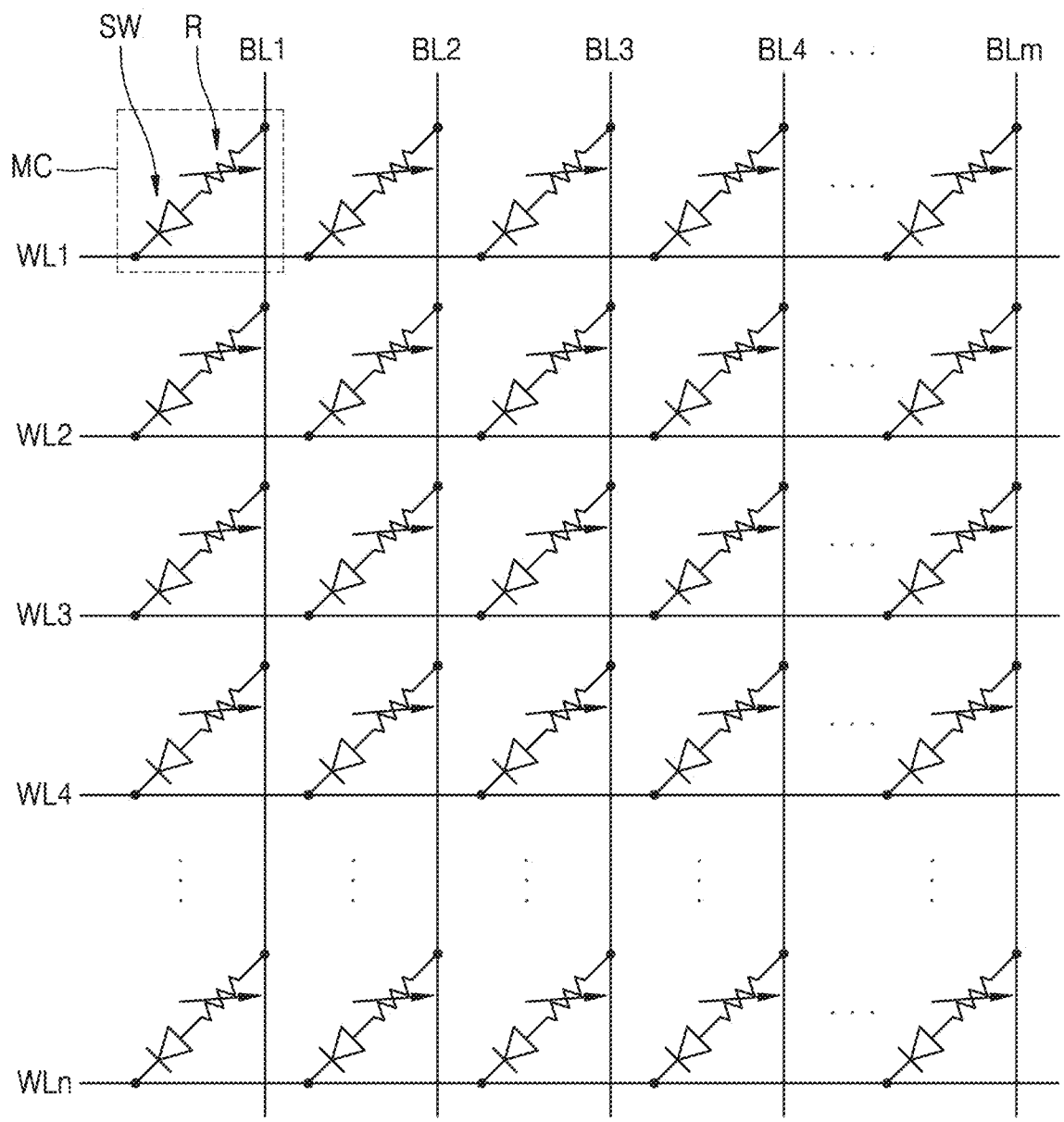
FIGS. 2A and 2B are circuit diagrams showing examples of a memory cell array included in a memory region of FIG. 1.
Figure 2B:
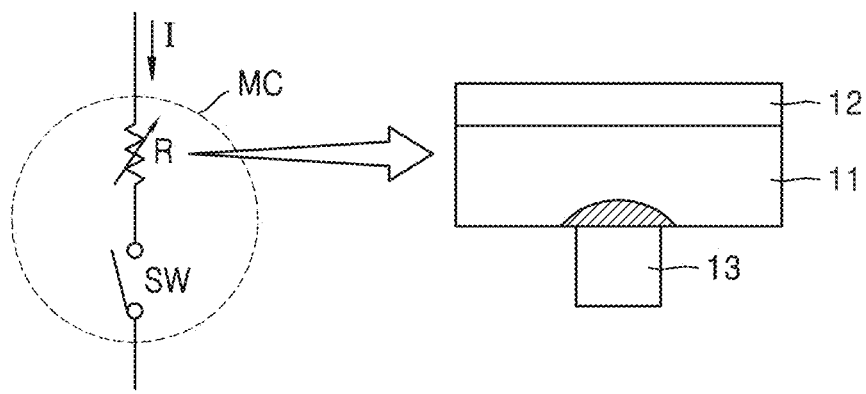

FIGS. 2A and 2B are circuit diagrams showing examples of a memory cell array included in a memory region of FIG. 1. In FIGS. 2A and 2B, cases where resistive memory cells include PRAMs are exemplified.

For example, the memory cell array of a first memory region 210_1 may be a 2-dimensional memory cell array having a horizontal structure and may include a plurality of word lines WL1 to WLn, a plurality of bit lines BL1 to BLm, and a plurality of memory cells MC. A memory cell array may include a plurality of memory blocks. Each memory block may include a plurality of memory cells arranged in rows and columns. Here, the number of word lines WL, the number of bit lines BL, and the number of the memory cells MC may vary according to embodiments. However, the inventive concepts are not limited thereto. According to another embodiment, the memory cell array of the first memory region 210_1 may be a vertical 3-dimensional memory cell array.

According to some example embodiments, each of the memory cells MC may include a variable resistive element R and a switching element SW. Here, the variable resistive element R may be referred to as a variable resistive material, and the switching element SW may be referred to as a selecting element.

In some example embodiments, the variable resistive element R may be connected between one of the bit lines BL1 to BLm and the switching element SW, and the switching element SW may be connected between the variable resistive element R and one of the word lines WL1 to WLn. However, the inventive concepts are not limited thereto, and the switching element SW may be connected between one of the bit lines BL1 to BLm and the variable resistive element R, and the variable resistive element R may be connected to the switching element SW and one of the word lines WL1 to WLn.

The switching element SW may be connected between any one of the word lines WL1 to WLn and the variable resistive element R and may control supply of a current to the variable resistive element R according to voltages applied to a word line and a bit line connected to the switching element SW. Although FIG. 2A shows that the switching element SW is a diode, it is merely an embodiment. According to some example embodiments, the switching element SW may be changed to another switchable element.

Referring to FIG. 2B, the memory cell MC may include the variable resistive element R and the switching element SW. The switching element SW may be implemented using various elements like a transistor, a diode, and the like. The variable resistive element R may include a phase change film 11 including a mixture of germanium, antimony, and tellurium (GST, Ge—Sb—Te), an upper electrode 12 on the phase change film 11, and a lower electrode 13 below the phase change film 11.

The upper electrode 12 and the lower electrode 13 may include various metals, metal oxides, or metal nitrides. The upper and lower electrodes 12 and 13 may include aluminum (Al), copper (Cu), titanium nitride (TiN), titanium aluminum nitride ($Ti_xAl_yN_z$), iridium (Jr), platinum (Pt), silver (Ag), gold (Au), polysilicon, tungsten (W), titanium (Ti), tantalum (Ta), tantalum nitride (TaN), tungsten nitride (WN), nickel (Ni), cobalt (Co), chromium (Cr), antimony (Sb), iron (Fe), molybdenum (Mo), palladium (Pd), tin (Sn), zirconium (Zr), zinc (Zn), iridium oxide ($IrO_2$), strontium oxide zirconate ($StZrO_3$), etc.

The phase change film 11 may include a bipolar resistive memory material or a unipolar resistive memory material. The bipolar resistive memory material may be programmed to a set state or reset state according to the polarity of a current and may include a Perovskite-based material. The unipolar resistive memory material may be programmed to a set state or a reset state by a current of a same polarity and may include a transition metal oxide like $NiO_x$ or $TiO_x$.

A GST material may be programmed between an amorphous state having a relatively high resistivity and a crystalline state having a relatively low resistivity. The GST material may be programmed by heating the GST material. The GST material may remain in an amorphous state or a crystalline state based on the magnitude and time of heating the GST material. The high resistivity and the low resistivity may be respectively represented by programmed logic values 0 and 1 and may be detected by measuring the resistivity of the GST material. On the contrary, the high resistivity and the low resistivity may be represented by programmed logic values 1 and 0, respectively.

In FIG. 2B, when a write current I is applied to the memory cell MC, the write current I flows through the lower electrode 13. When the write current I is applied to the memory cell MC for a very short time, a film adjacent to the lower electrode 13 is heated by the Joule's heat. At this time, a portion of the phase change film 11 becomes a crystalline state (or a set state) or an amorphous state (or a reset state) due to a difference in heating profiles.

Figure 3:
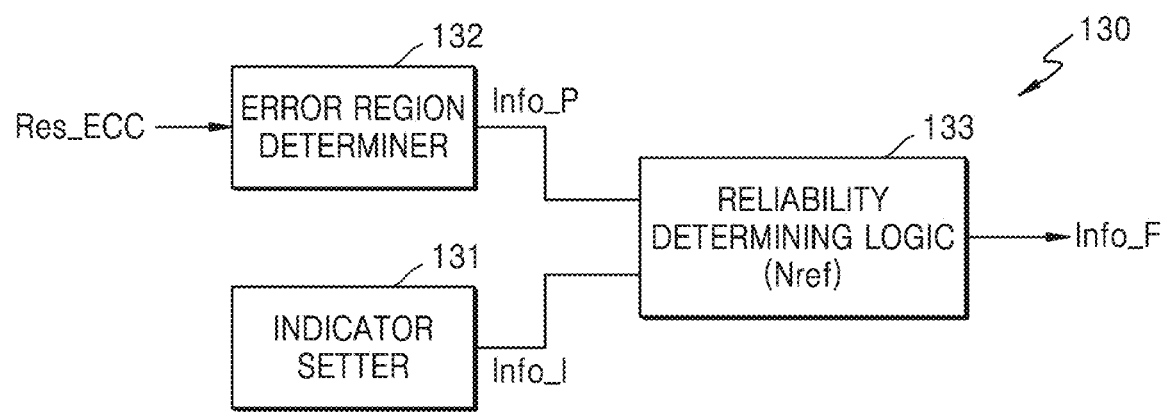
FIG. 3 is a block diagram showing an implementation of the reliability determiner of FIG. 1.

FIG. 3 is a block diagram showing an implementation of the reliability determiner 130 of FIG. 1.

Referring to FIGS. 1 and 3, the reliability determiner 130 may include an indicator setter 131, an error region determiner 132, and/or a reliability determining logic 133. The indicator setter 131 may set at least one memory region from among the first to N-th memory regions 210_1 to 210_N as an indicator according to the above-described embodiments.

The error region determiner 132 may determine a memory region (or location of a memory region) in which an error occurred during a memory operation for the memory device 200. For example, error detection and correction are performed for a codeword read from the first to N-th memory regions 210_1 to 210_N of the memory device 200, and the error region determiner 132 may determine a region in which an error occurred by referring to a result of an error detection from the ECC circuit 120. For example, a plurality of bits constituting a codeword may be stored in the first to N-th memory regions 210_1 to 210_N in a distributed manner, and a location of a memory region, in which an error occurred, from among the first to N-th memory regions 210_1 to 210_N may be determined by detecting bits with errors. The error region determiner 132 may output error location information Info_P according to a result of the determination.

The reliability determining logic 133 may receive indicator location information Info_I indicating a memory region corresponding to an indicator from the indicator setter 131 and receive the error location information Info_P from the error region determiner 132 simultaneously. In addition, the reliability determining logic 133 may output the reliability deterioration information Info_F indicating whether the reliability of the memory device 200 is deteriorated based on the indicator location information Info_I and the error location information Info_P. For example, as described above, the reliability determining logic 133 may determine an error occurrence frequency in a memory region corresponding to an indicator based on the indicator location information Info_I and the error location information Info_P and may also determine whether the error occurrence frequency exceeded a certain reference value Nref. Also, the reliability determining logic 133 may output the reliability deterioration information Info_F according to a result of the determination. In various examples, when an error occurrence frequency in a memory region corresponding to an indicator exceeds a certain reference value, the reliability determining logic 133 may output reliability deterioration information Info_F indicating that the reliability of the memory device 200 is deteriorated (or the lifespan of the memory device 200 ended).

The various components shown in FIG. 3 may be implemented in various forms to perform corresponding functions. For example, the various components shown in FIG. 3 may be implemented as a hardware circuit or software including programs that may be executed by the processor 110. Alternatively, the various components shown in FIG. 3 may be implemented as a combination of hardware and software.

Hereinafter, various implementations of a memory system according to example embodiments will be described. Furthermore, it will be assumed in the below embodiments that a memory device is a memory module including a plurality of memory chips. However, the memory device may be implemented in various other forms as described above.

Figure 4:
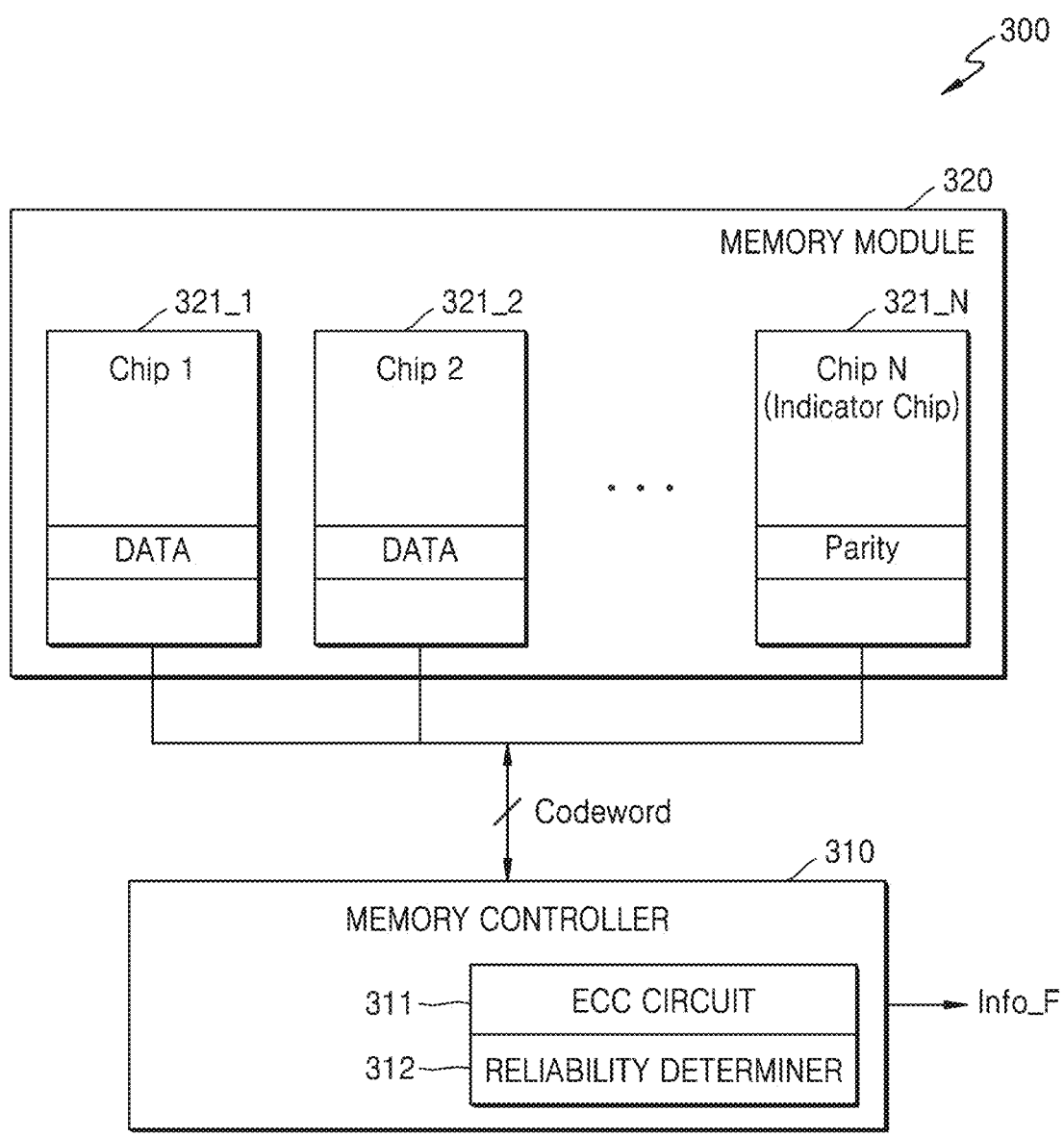
FIG. 4 is a block diagram showing a memory system according to an example embodiment.

FIG. 4 is a block diagram showing a memory system according to an example embodiment.

Referring to FIG. 4, a memory system 300 may include a memory controller 310 and a memory module 320. The memory controller 310 may include an ECC circuit 311 and/or a reliability determiner 312. Although not shown in FIG. 4, the memory controller 310 may further include various other components for controlling a memory operation, e.g., a processor, a host I/F, and a memory I/F.

The memory module 320 may include a plurality of memory chips mounted on a module board. For example, the memory module 320 may include first to N-th memory chips 321_1 to 321_N. In addition, according to the above-described embodiments, the reliability determiner 312 may set at least one memory chip from among the first to N-th memory chips 321_1 to 321_N as an indicator chip. In FIG. 4, an example in which an N-th memory chip 321_N is set as an indicator chip is shown. For example, the reliability determiner 312 may set an indicator chip based on reliability information regarding the first to N-th memory chips 321_1 to 321_N from the memory module 320 or set an indicator chip through a testing operation for the first to N-th memory chips 321_1 to 321_N or a number of dummy program operations for a particular memory chip. Although FIG. 4 shows that the N-th memory chip 321_N storing parity data Parity corresponds to an indicator chip, normal data may be stored in the N-th memory chip 321_N.

The ECC circuit 311 of the memory controller 310 may generate the parity data Parity through an ECC encoding operation and a codeword including normal data DATA and the parity data Parity may be stored in the first to N-th memory chips 321_1 to 321_N in a distributed manner. Also, a codeword may be read from the first to N-th memory chips 321_1 to 321_N and provided to the ECC circuit 311. The ECC circuit 311 may perform an error detection operation through an ECC decoding operation and provide a result thereof to the reliability determiner 312.

The reliability determiner 312 may determine whether an error has occurred in the N-th memory chip 321_N corresponding to the indicator chip based on information regarding the indicator chip set therein and an error detection result from the ECC circuit 311. When an error has occurred in a memory chip other than the N-th memory chip 321_N, the reliability determiner 312 may determine that, since an error has occurred in a memory chip having relatively high reliability and a long lifespan, there is no influence on the reliability of the memory module 320. On the other hand, when an error has occurred in the N-th memory chip 321_N corresponding to the indicator chip, the reliability determiner 312 may determine that an error has occurred due to a short lifespan of the memory module 320, and thus the reliability determiner 312 may output the reliability deterioration information Info_F.

According to some example embodiments shown in FIG. 4, it is not needed to provide a counter for counting the number of writing and/or erasing operations to manage the lifespan of a plurality of memory chips mounted on the memory module 320 and the possibility of data reliability deterioration may be informed to a host before the lifespan of the memory module 320 ends by setting a memory chip with relatively low reliability to an indicator chip and monitoring the same. In other words, before data stored in a memory chip is actually lost, it may be determined in advance that the lifespan of the memory module 320 is about to end through an indicator chip having a relatively short lifespan, and the reliability deterioration information Info_F may be provided to a host to induce a user to replace the memory module 320.

In some example embodiments described above, the memory module 320 may be implemented in the form of a single in-line memory module (SIMM) or a dual in-line memory module (DIMM). In addition, the memory module 320 may correspond to various types of DIMMs. For example, various types of DIMMs like an FB-DIMM and an LR-DIMM may be applied to the memory module 320. Alternatively, the memory module 320 may correspond to a non-volatile DIMM (NVDIMM) including a non-volatile memory (e.g., a flash memory (not shown)) to compensate for the problem of a volatile memory in which data is lost when the power is turned off.

Also, as an example of various types of modules, the memory module 320 may be referred to as P_DIMM when the memory module 320 includes PRAM as a resistive memory. Example embodiments may also be applied to various other types of modules. For example, as the memory module 320 includes cross-point memory chips having 3-dimensional type resistive memory cells, the memory module 320 may be referred to as a XPoint DIMM (or a 3D XPoint DIMM).

Figure 5:
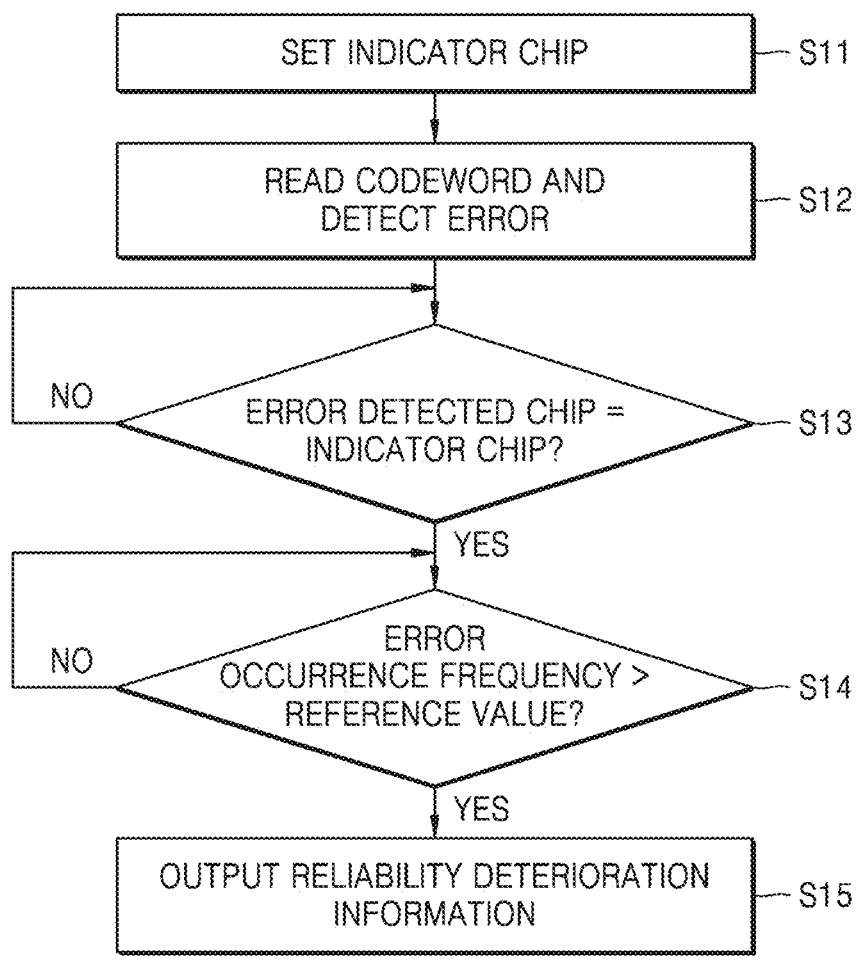
FIG. 5 is a flowchart of a method of operating a memory controller, according to an example embodiment.

FIG. 5 is a flowchart of a method of operating a memory controller, according to an example embodiment.

Referring to FIG. 5, the memory controller may control memory operations for a plurality of memory chips, determine a memory chip with a relatively low-reliability (or a relatively short lifespan) from among the memory chips, and set at least one memory chip as an indicator chip according to a result of the determination (operation S11).

The memory controller may read a codeword from the memory chips and detect an error through an ECC decoding process for the codeword (operation S12). Also, by detecting a location of an error bit from among a plurality of bits included in a codeword, the memory controller may determine a memory chip in which an error has occurred.

Based on information regarding the memory chip in which an error has occurred (or is detected) and information regarding the indicator chip previously stored therein, the memory controller may determine whether the memory chip in which an error has occurred (or is detected) corresponds to the indicator chip (operation S13). When the memory chip in which an error has occurred (or is detected) is not the indicator chip, it may be repeatedly determined whether an error has occurred in the indicator chip for a codeword read next.

When the memory chip in which an error has occurred (or is detected) corresponds to the indicator chip, it may be determined whether an error occurrence frequency in the indicator chip exceeds a certain reference value (operation S14). Also, the memory controller may output reliability deterioration information when the error occurrence frequency exceeds the certain reference value (operation S15). The operation for determining whether the reference value is exceeded and the operation for outputting the reliability deterioration information according to the example embodiments may be implemented by various methods. For example, reliability deterioration information may be output every time an error occurs in the indicator chip. Alternatively, reliability deterioration information may be output when the error occurs continuously in the indicator chip exceeding the reference value. Alternatively, reliability deterioration information may be output when an error occurrence frequency in the indicator chip during a certain number of read operations exceeds a certain reference value. In addition, other criteria for outputting reliability deterioration information may be set using various other methods.

Figure 6:
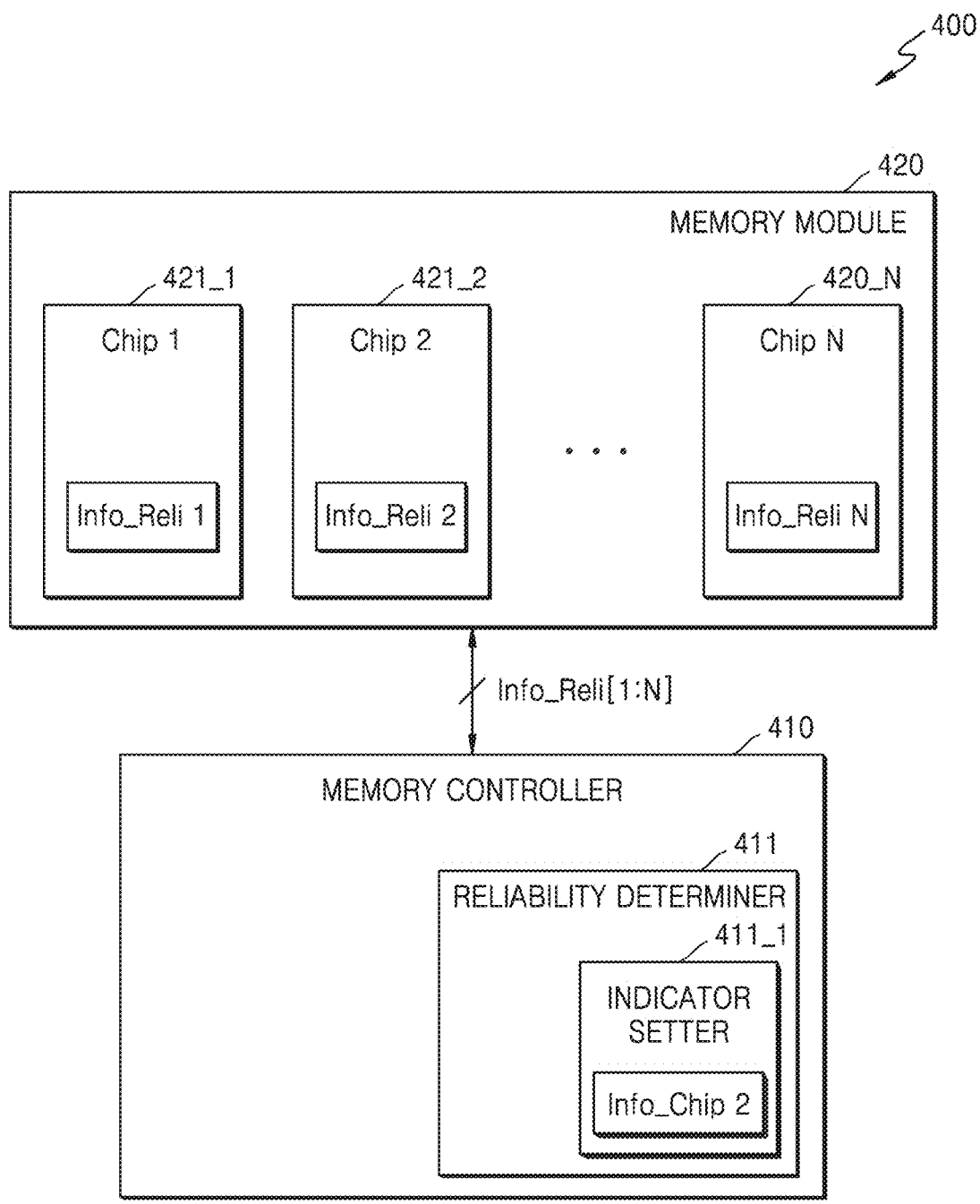
FIGS. 6 to 9B are diagrams showing various embodiments for setting an indicator chip.

FIG. 6 is a block diagram showing a memory system according to a modified example embodiment. FIG. 6 shows a case in which an indicator chip is set based on reliability information previously stored in a memory module.

Referring to FIG. 6, a memory system 400 may include a memory controller 410 and a memory module 420. The memory module 420 may include first to N-th memory chips 421_1 to 421_N, and at least one memory chip may be set as an indicator chip under the control of the memory controller 410.

For example, the performance of each of the first to N-th memory chips 421_1 to 421_N may be tested during a fabrication process of the memory module 420, and the reliability of the first to N-th memory chips 421_1 to 421_N (e.g., the number of times of writing and/or erasing operations with guaranteed reliability) may be determined based on a result of the test. Also, lifespan information (or reliability information) based on the result of the test may be stored in the memory module 420. Reliability information Info_Reli 1 to Info_Reli N from the memory module 420 may be provided to the memory controller 410 during an initial operation of the memory system 400.

The memory controller 410 may include a reliability determiner 411, and the reliability determiner 411 may include an indicator setter 411_1. The indicator setter 411_1 may set at least one memory chip as an indicator chip in the memory module 420 based on the reliability information Info_Reli 1 to Info_Reli N. FIG. 6 shows an example in which a second memory chip 421_2 is set as an indicator chip according to a result of determining the reliability information Info_Reli 1 to Info_Reli N.

The indicator setter 411_1 may store information Info_Chip2 indicating that the second memory chip 421_2 corresponds to the indicator chip according to a result of the setting and, during a reading operation for the memory module 420, output the reliability deterioration information by comparing a memory chip in which an error has occurred from among the first to N-th memory chips 421_1 to 421_N to the information Info_Chip2.

Figure 7:
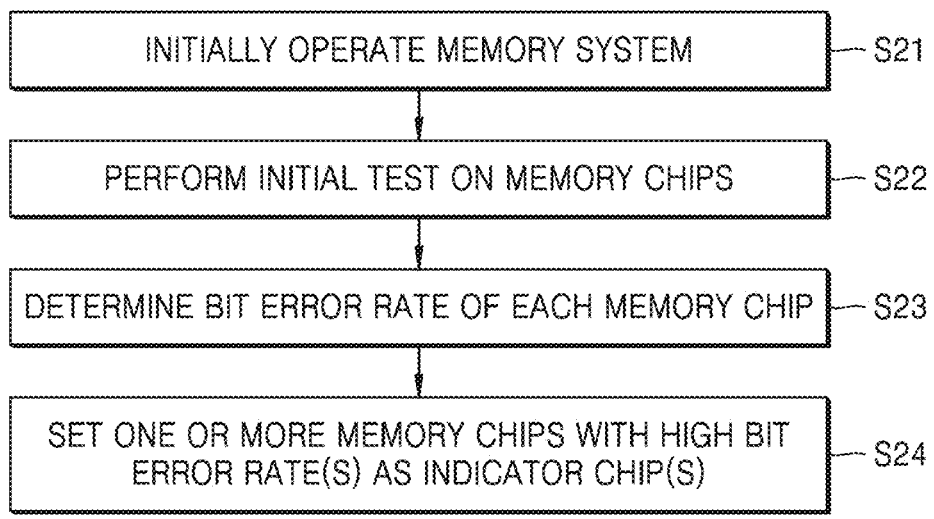

FIG. 7 is a flowchart of a method of operating a memory controller, according to a modified example embodiment. FIG. 7 shows an example in which an indicator chip is set through an initial testing operation for a memory module.

As a memory system including a memory controller and a memory module is initially operated (operation S21), various information regarding a memory operation may be transmitted and received between the memory controller and the memory module. In addition, the memory controller may perform an initial testing operation for memory chips of the memory module (operation S22). For example, the memory controller may write a certain test pattern to the memory chips, read the test pattern, and determine the reliability of the memory chips through an error detection operation for the test patterns. For example, the memory controller may determine a bit error rate (BER) of each of the memory chips through the initial testing operation (operation S23), and a memory chip with relatively low reliability may be determined through the determination of the BER. Also, one or more memory chips with relatively high BERs may be set as indicator chips (operation S24).

According to some example embodiments, even when lifespan information regarding memory chips is not stored in a memory module, a memory chip with relatively low reliability may be determined through an initial testing operation by a memory controller, and an operation for setting an indicator chip may be performed based on a result of the determination.

Although FIG. 7 shows an example of setting an indicator chip based on a BER, example embodiments are not limited thereto, and an indicator chip may be set based on various criteria. For example, error occurrence frequencies may be detected with respect to a plurality of memory chips, and a memory chip corresponding to the highest error occurrence frequency may be set as an indicator chip. As described above, the functionality of the reliability determiner 130 of FIGS. 1, 3, 4, and 6 may be implemented in the processor 110 or as a separate hardware and/or processor/software component.

Figure 8:
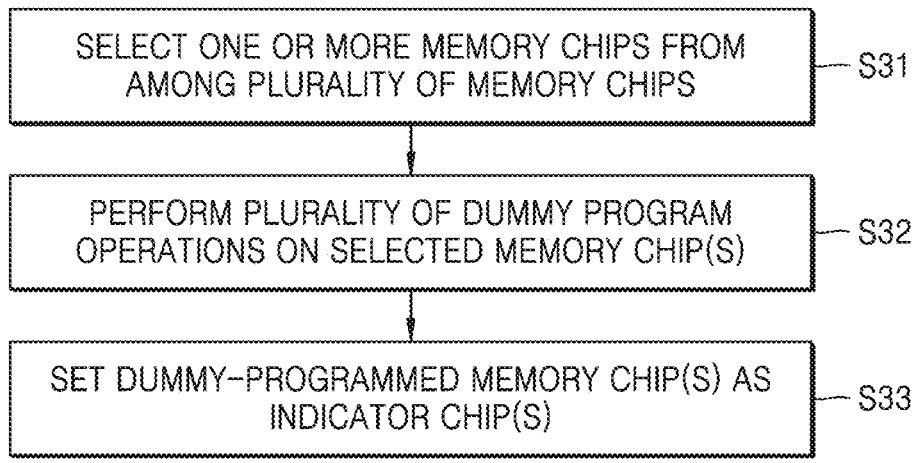

FIG. 7 is a flowchart of a method of operating a memory controller, according to another modified example embodiment. FIG. 8 shows an example in which a memory chip with artificially deteriorated reliability is set as an indicator chip based on the control of a memory controller.

Referring to FIG. 8, a memory controller may control a memory operation of a memory module including a plurality of memory chips, e.g., a dummy program operation for writing dummy data having an arbitrary pattern to a plurality of memory chips. According to an example embodiment, when there is no information regarding a memory chip with relatively low reliability from among a plurality of memory chips, the memory controller may perform an artificial control operation for deteriorating reliability of at least one memory chip from among the memory chips and set the memory chip with deteriorated reliability as an indicator.

For example, the memory controller may select one or more memory chips from among a plurality of memory chips (operation S31) and perform a plurality of dummy program operations on the selected memory chip (operation S32). Dummy program operations may be performed repeatedly until the lifespan of the selected memory chip is slightly deteriorated, and the memory controller may set the memory chip on which the dummy program operations are performed as an indicator chip (operation S33).

When dummy program operations are performed on a first memory chip from among the memory chips for a plurality of number of times, the write count of the first memory chip becomes greater than those of the other memory chips. Therefore, the first memory chip may have a shorter lifespan than the other memory chips. Also, by setting the first memory chip as an indicator chip, the possibility of data loss in the memory module may be reduced.

Figure 9A:
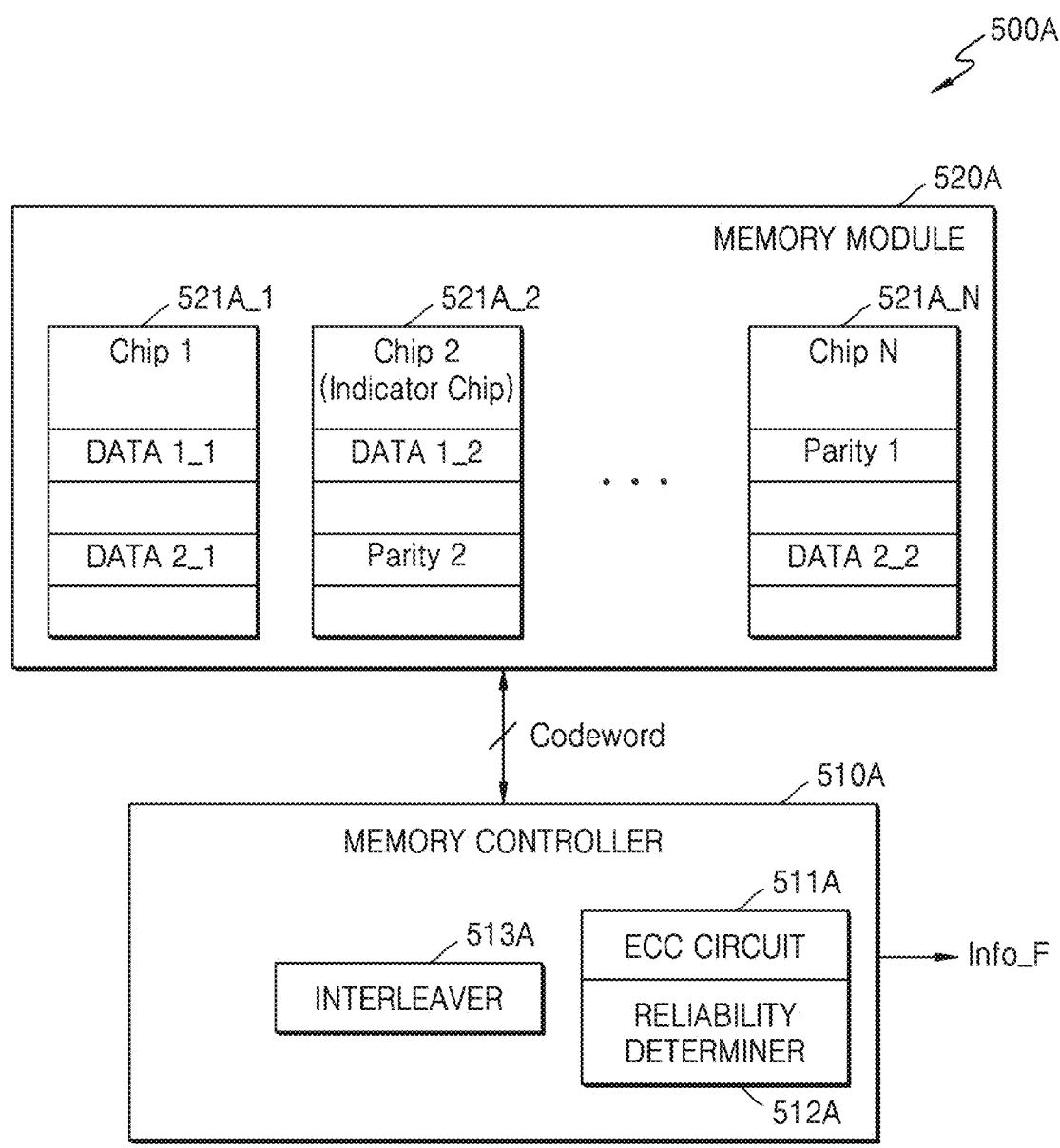
Figure 9B:
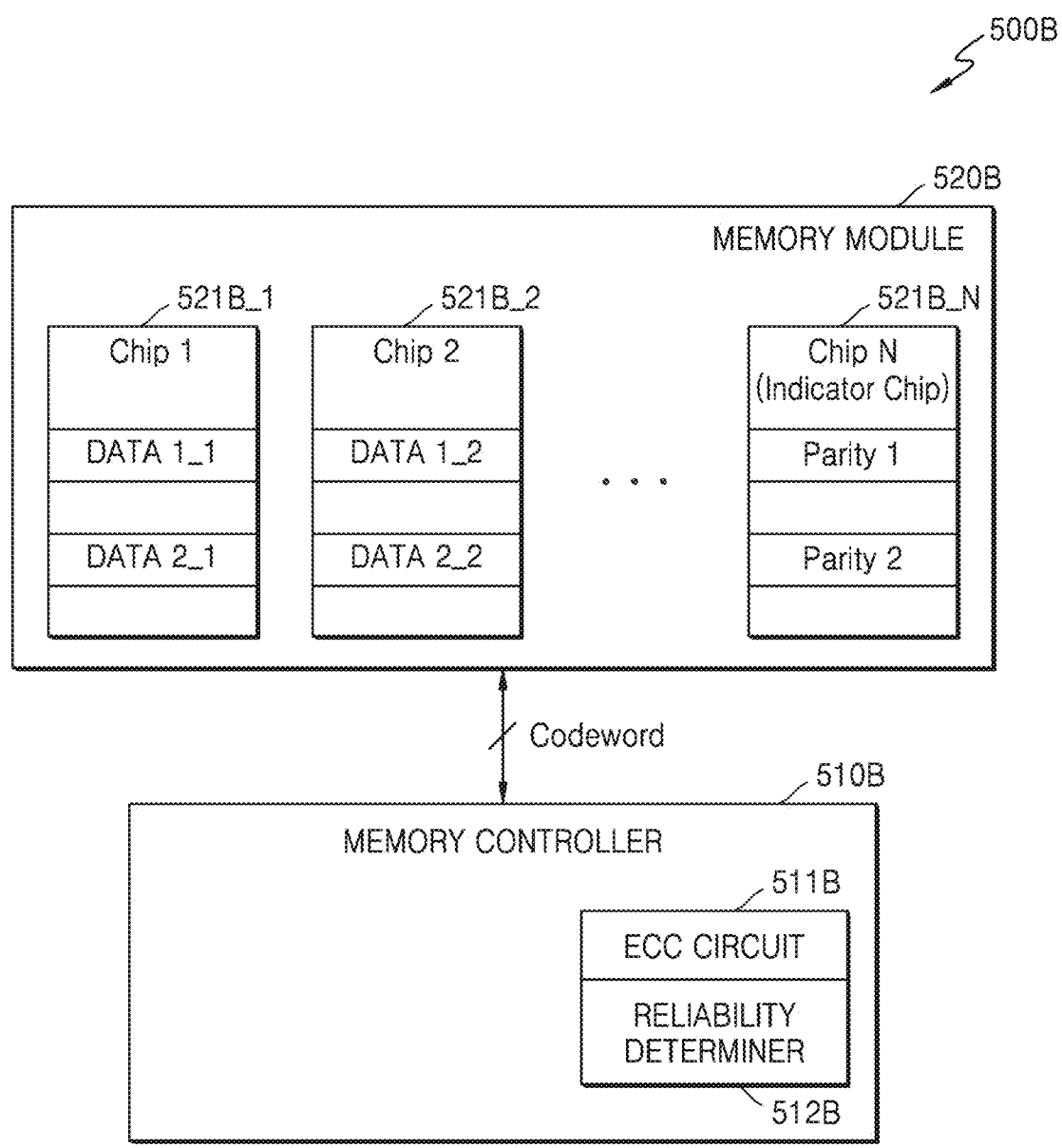

FIGS. 9A and 9B are block diagrams showing a method of operating a memory controller, according to another modified example embodiment. FIGS. 9A and 9B show a case where interleaving is applied to operations for writing and reading a codeword and a case where interleaving is not applied, respectively.

Referring to FIG. 9A, a memory system 500A may include a memory controller 510A and a memory module 520A. The memory controller 510A may include an ECC circuit 511A, a reliability determiner 512A, and/or an interleaver 513A. The ECC circuit 511A and the reliability determiner 512A may perform operations that are the same as or similar to the operations according to the above-described embodiments, thereby outputting reliability deterioration information according to example embodiments. In addition, the memory module 520A may include first to N-th memory chips 521A_1 to 521A_N, reliability of the first to N-th memory chips 521A_1 to 521A_N may be determined according to the above-stated embodiments, and it is assumed that the second memory chip 521A_2 corresponds to a memory chip with relatively low reliability (relatively short lifespan).

The memory controller 510A may store a codeword including normal data and parity data in the first to N-th memory chips 521A_1 to 521A_N of the memory module 520A. At this time, an interleaver 513A may interleave a plurality of bits of the codeword to normalize locations of error bits, and interleaved bits of the codeword may be stored in the first to N-th memory chips 521A_1 to 521A_N. For example, parity data Parity 1 in a first codeword may be stored in an N-th memory chip 521A_N and normal data DATA1_1 and DATA1_2 may be stored in the other memory chips. On the other hand, parity data Parity 2 in a second codeword may be stored in the second memory chip 521A_2 and normal data DATA2_1 and DATA2_2 may be stored in the other memory chips.

In some example embodiments shown in FIG. 9A, as interleaving is applied to the memory module 520A, the frequencies of use of the first to N-th memory chips 521A_1 to 521A_N may become similar to one another. For example, even when normal data is only partially changed in one codeword, parity data corresponding to the normal data may be changed together. Therefore, the frequency of use (or the write count) of a memory chip storing the parity data may be increased as compared to the other memory chips. However, as the frequencies of use of the first to N-th memory chips 521A_1 to 521A_N are similar to one another in the embodiment shown in FIG. 9A, the second memory chip 521A_2 with a relatively low reliability (a relatively short lifespan) may be set as an indicator chip.

Referring to FIG. 9B, a memory system 500B may include a memory controller 510B and a memory module 520B, the memory controller 510B may include an ECC circuit 511B and/or a reliability determiner 512B, and the memory module 520B may include first to N-th memory chips 521B_1 to 521B_N. The memory controller 510B may store a bit at a particular location of a codeword in a particular memory chip of the memory module 520B without applying interleaving in storing of the codeword in the memory module 520B. For example, parity data of a codeword may be fixedly stored in an N-th memory chip 521B_N of the memory module 520B. For example, parity data Parity 1 in a first codeword may be stored in the N-th memory chip 521B_N, and normal data DATA1_1 and DATA1_2 may be stored in the other memory chips. Furthermore, parity data Parity 2 in a second codeword may be stored in the N-th memory chip 521B_N and normal data DATA2_1 and DATA2_2 may be stored in the other memory chips.

As described above, the N-th memory chip 521B_N storing parity data Parity 1 and Parity 2 is used more frequently than the other memory chips, and thus the lifespan of the N-th memory chip 521B_N may be shorter than those of the other memory chips. Accordingly, the memory controller 510B may determine the N-th memory chip 521B_N to store the parity data Parity 1 and Parity 2 and set the N-th memory chip 521B_N as an indicator chip. In addition, through an error detection operation on a read codeword, an error occurrence frequency in the N-th memory chip 521B_N may be monitored, and reliability deterioration information according to the above-described embodiments may be output based thereon.

Figure 10:
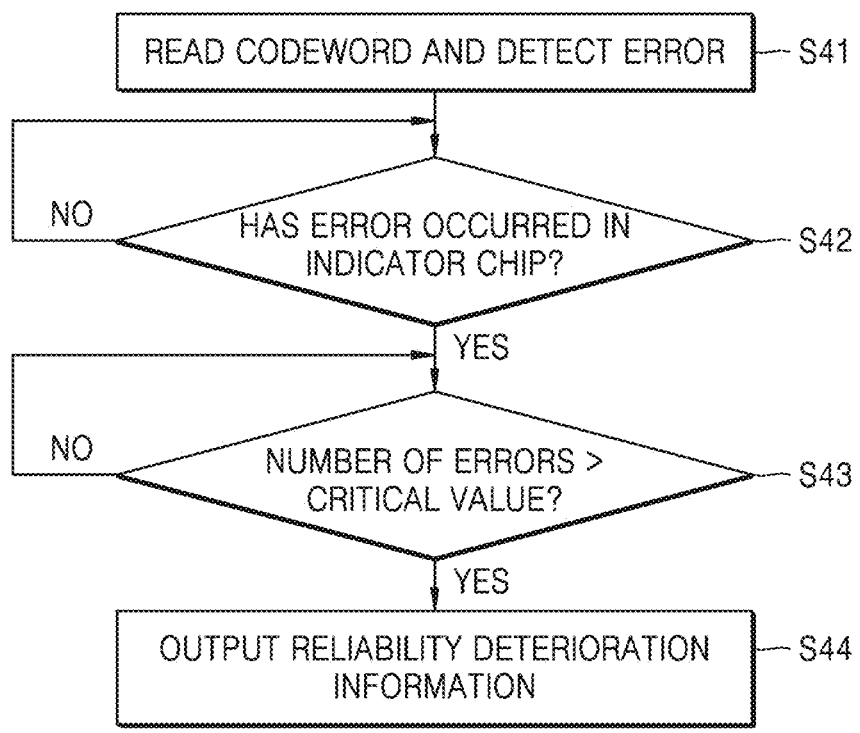
FIGS. 10 and 11 are flowcharts showing operations for outputting reliability deterioration information according to example embodiments.
Figure 11:
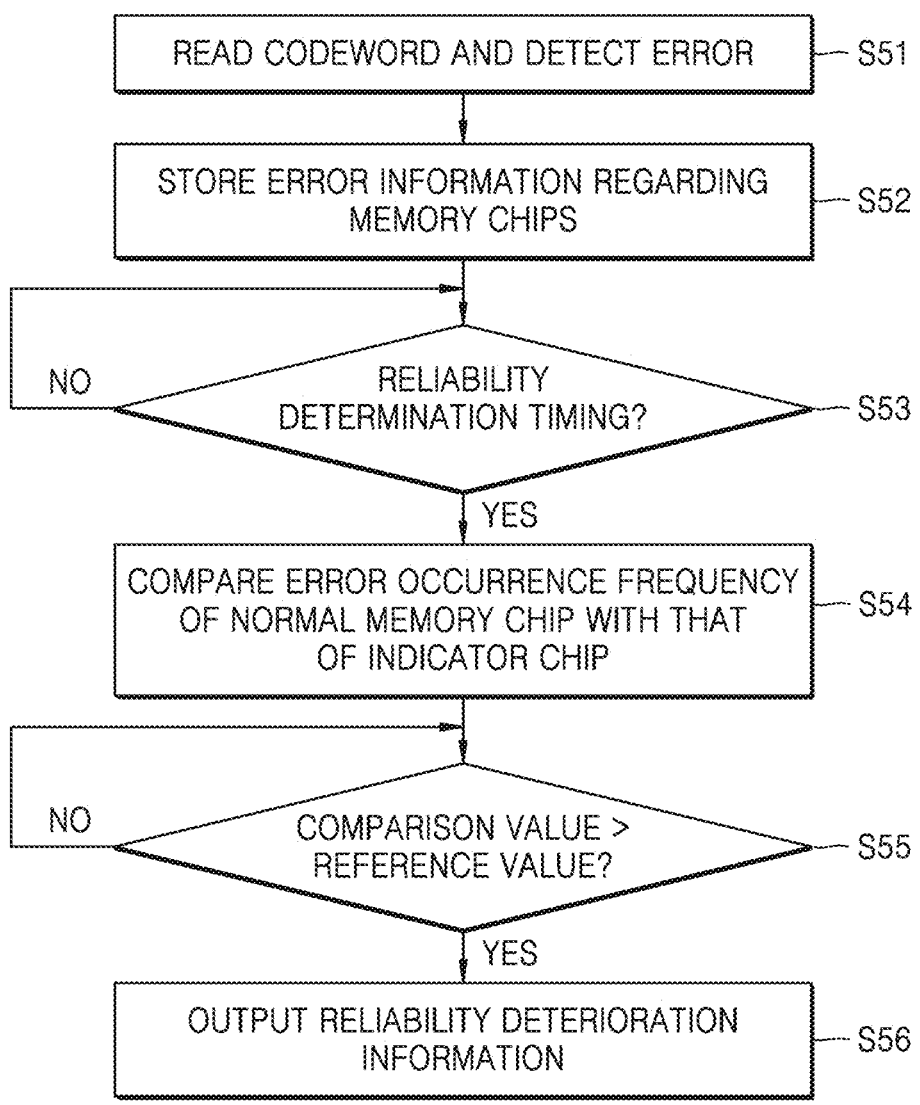

FIGS. 10 and 11 are flowcharts showing operations for outputting reliability deterioration information according to example embodiments. FIG. 10 shows an example in which reliability deterioration information is output based on a BER, and FIG. 11 shows an example in which reliability deterioration information is output based on error occurrence frequency of an indicator chip as compared to those of normal memory chips.

Referring to FIG. 10, a codeword may be read through a read operation for a memory module including a plurality of memory chips, and an error detection operation on the codeword may be performed (operation S41). In addition, it may be determined whether an error has occurred in an indicator chip by comparing pre-stored information regarding the indicator chip with a memory chip in which an error has occurred (operation S42).

When an error has occurred in the indicator chip, the number of errors occurred in data of a certain size may be detected, and it may be determined whether the number of detected errors exceeds a certain threshold (operation S43). When the number of detected errors is equal to or less than the reference value, it may be determined that the reliability of the memory module has not yet deteriorated. On the other hand, when the number of detected errors exceeds the reference value, it may be determined that the reliability of the memory module is deteriorated, and thus reliability deterioration information may be output (operation S44).

Referring to FIG. 11, an error detection operation on a codeword read from a memory module including a plurality of memory chips may be performed (operation S51), and information regarding error occurrences in a the memory chips (e.g., error information) may be stored in the memory controller (operation S52). In addition, the reliability of the memory module may be periodically determined, and it may be determined whether it corresponds to a reliability determination timing (operation S53).

At the reliability determination timing, an error occurrence frequency of an indicator chip may be compared with that of a normal memory chip by referring to error information stored in the memory controller (operation S54). For example, a comparison value may be calculated as a result of comparing an error occurrence frequency of the indicator chip with an error occurrence frequency of a normal memory chip, and it may be determined whether the comparison value exceeds a certain reference value (operation S55). When the comparison value exceeds the certain reference value, reliability deterioration information may be output (operation S56).

The reliability deterioration information may be output based on various criteria other than the method described in the above embodiments. In other words, characteristics of error occurrences in the indicator chip are determined, and it may be controlled whether to output reliability deterioration information based on various criteria.

Figure 12:
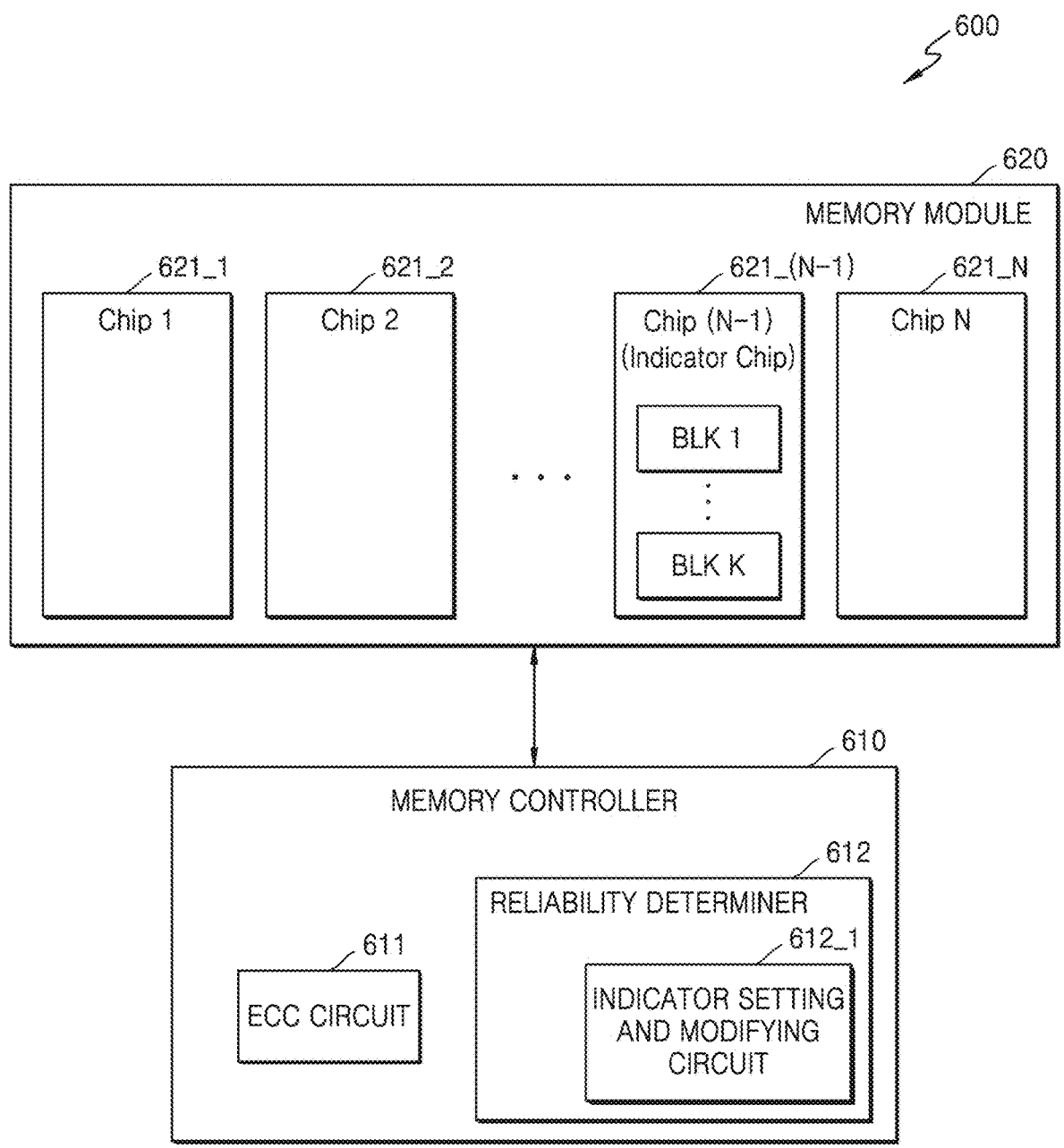
FIGS. 12 and 13 are diagrams showing a method of operating a memory controller, according to another modified example embodiment.
Figure 13:
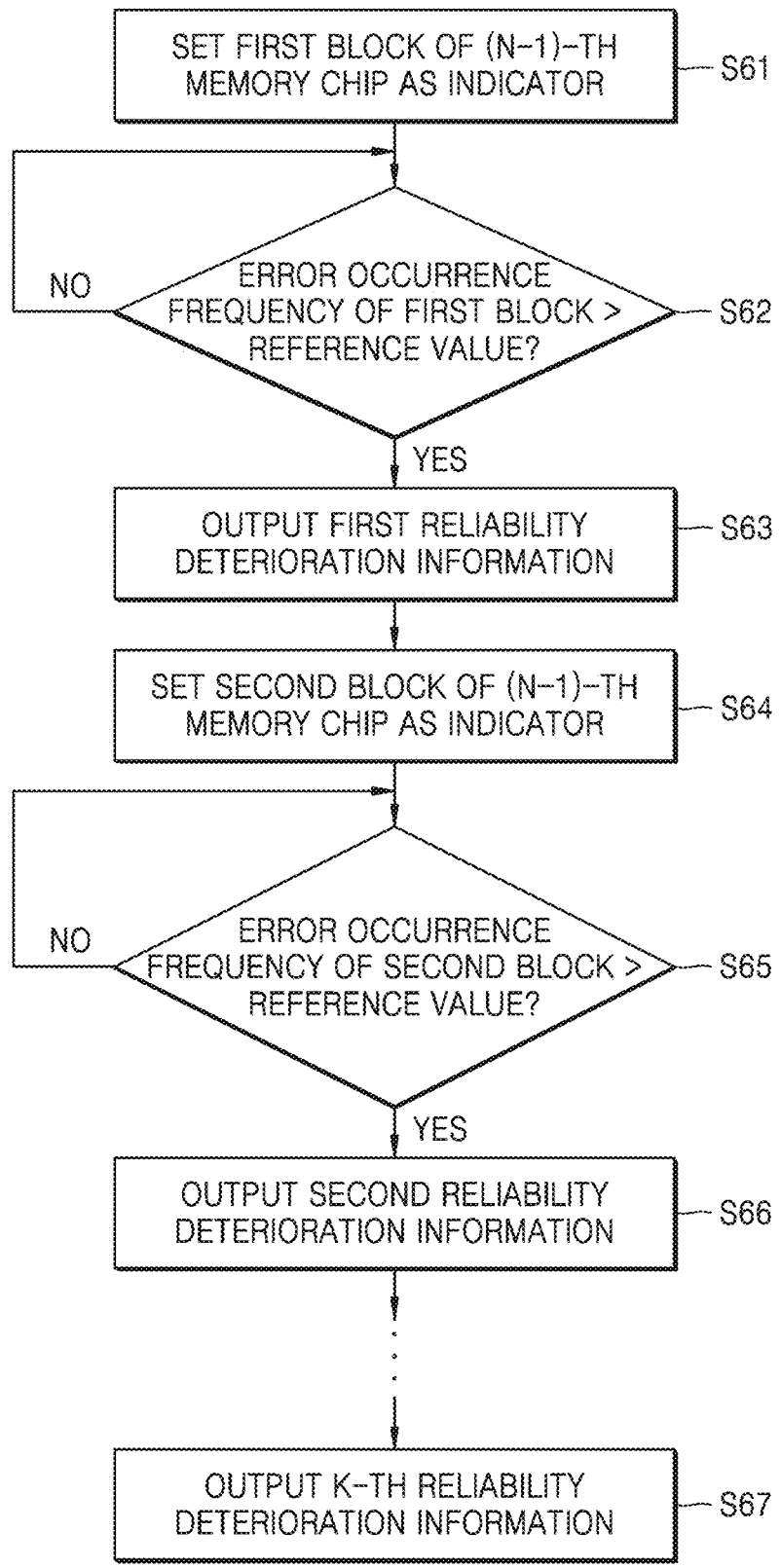

FIGS. 12 and 13 are diagrams showing a method of operating a memory controller, according to another modified example embodiment.

Referring to FIG. 12, a memory system 600 may include a memory controller 610 and a memory module 620. The memory controller 610 may include an ECC circuit 611 and/or a reliability determiner 612, and the reliability determiner 612 may include an indicator setting and/or modifying circuit 612_1. In addition, the memory module 620 may include first to N-th memory chips 621_1 to 621_N. FIG. 12 shows an example in which an (N−1)-th memory chip 621_(N−1) is set as an indicator chip. According to the above-described embodiments, the (N−1)-th memory chip 621_(N−1) may correspond to a memory chip having the lowest reliability in the memory module 620 or a memory chip in which parity data of codeword data fixedly stored.

Each of the first to N-th memory chips 621_1 to 621_N includes a plurality of cell blocks for storing data. For example, the (N−1)-th memory chip 621_(N−1) may include first to K-th cell blocks BLK 1 to BLK K. According to an example embodiment, the first to K-th cell blocks BLK 1 to BLK K of the (N−1)-th memory chip 621_(N−1) may be used sequentially or together, and an operation for determining a location of an error to output reliability deterioration information according to the example embodiments may be performed on a cell block basis.

According to an example embodiment, when a first cell block BLK 1 of the (N−1)-th memory chip 621_(N−1) may be set as an indicator region, and it may be monitored whether an error has occurred in the first cell block BLK 1. When an error has occurred in the first cell block BLK 1, reliability deterioration information may be output according to various criteria in the above-described embodiments, and the indicator setting and modifying circuit 612_1 may set another cell block of the (N−1)-th memory chip 621_(N−1) as an indicator region. In addition, when error occurrences in the changed indicator region is monitored and the error occurrence frequency in the changed indicator region exceeds a certain reference value, another cell block may be set as an indicator region.

An example of the operation of the memory system 600 shown in FIG. 12 will now be described with reference to FIG. 13. The first cell block BLK 1 of the (N−1)-th memory chip 621_(N−1) may be set as an indicator region (operation S61), and it may be determined whether the error occurrence frequency of the first cell block BLK 1 exceeds a pre-set reference value (operation S62). When the error occurrence frequency in the first cell block BLK 1 exceeds the reference value, first reliability deterioration information may be output (operation S63), and, as another cell block of the (N−1)-th memory chip 621_(N−1), a second cell block BLK 2) may be set as an indicator region (operation S64).

Then, it may be determined whether the error occurrence frequency in the second cell block BLK 2 set as the indicator region exceeds the pre-set reference value (operation S65) and, when the error occurrence frequency in the second cell block BLK 2 exceeds the reference value, second reliability deterioration information may be output (operation S66). Also, in the same regard as in the operation described above, another cell block of the (N−1)-th memory chip 621_(N−1) may be set as an indicator region, the error occurrence of a K-th cell block BLK K of the (N−1)-th memory chip 621_(N−1) set as the indicator region may be monitored, and, when the error occurrence frequency of the K-th cell block BLK K exceeds a pre-set reference value, reliability deterioration information may be output (operation S67).

According to an example embodiment described above, the degree of reliability deterioration may be classified into a plurality of stages and determined. For example, when first reliability deterioration information is output, a user may determine that the reliability is deteriorated in any one of the K cell blocks of an indicator chip and, when second reliability deterioration information is output thereafter, the user may determine that the reliability of two cell blocks of the indicator chip are deteriorated. Thereafter, when reliability deterioration information for the last K-th cell block BLK K is output, it may be determined that the reliability of all of the cell blocks of the indicator chip is degraded. Based on this, the need of replacing a memory module may be determined in stages.

Figure 14:
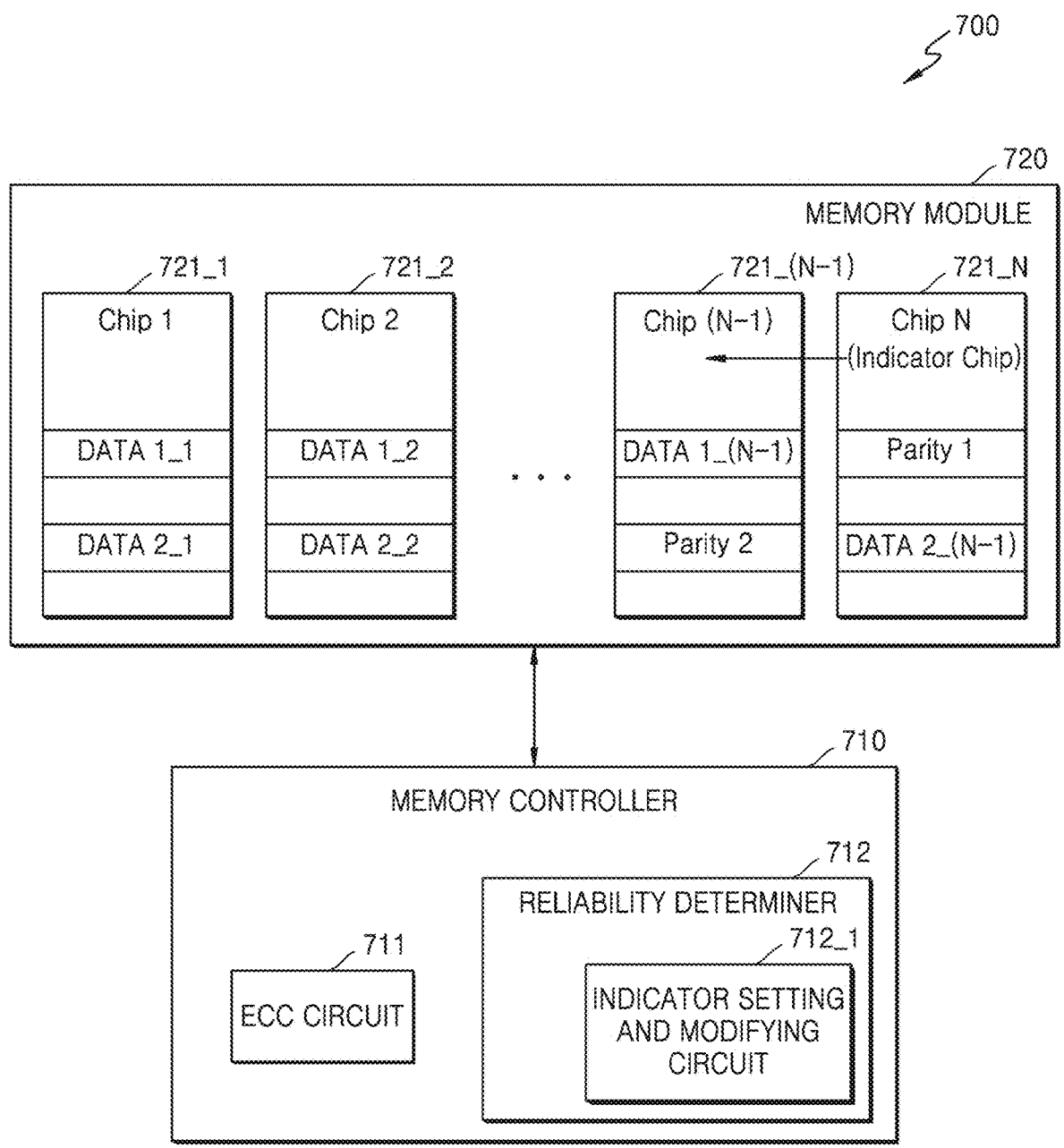
FIG. 14 is a block diagram showing a memory system according to another modified example embodiment.

FIG. 14 is a block diagram showing a memory system according to another modified example embodiment.

Referring to FIG. 14, a memory system 700 may include a memory controller 710 and a memory module 720. The memory controller 710 may include an ECC circuit 711 and/or a reliability determiner 712, and the reliability determiner 712 may include an indicator setting and/or modifying circuit 712_1. In addition, the memory module 720 may include first to N-th memory chips 721_1 to 721_N. FIG. 14 shows an example in which an N-th memory chip 721_N is set as an indicator chip during an initial indicator chip setting operation. In addition, according to an example embodiment, a memory chip storing parity data may be set as an indicator chip, wherein first parity data Parity 1 included in a first codeword may be stored in the N-th memory chip 721_N and normal data DATA1_1 to DATA1_(N−1) included in the first codeword may be stored in the other memory chips.

According to the above-described embodiments, the error occurrence in the N-th memory chip 721_N corresponding to the indicator chip may be monitored, and reliability deterioration information may be output according to a result of the monitoring. Also, as the reliability of the N-th memory chip 721_N is deteriorated, a memory chip in which parity data is stored may be changed, and the memory chip in which the parity data is stored may be set again as the indicator chip. In the example shown in FIG. 14, the memory chip in which the parity data is stored is changed to an (N−1)-th memory chip 721_(N−1), and thus the indicator chip is changed to the (N−1)-th memory chip 721_(N−1).

According to the above change of the indicator chip, second parity data Parity 2 included in a second codeword may be stored in the (N−1)-th memory chip 721_(N−1), and normal data DATA2_1 to DATA2_(N−1) may be stored in the other memory chips. Also, the error occurrence in the (N−1)-th memory chip 721_(N−1) corresponding to the indicator chip may be monitored through an error detection operation on the second codeword read from the memory module 720. When an error occurs in the (N−1)-th memory chip 721_(N−1), reliability deterioration information may be output according to the above-described embodiments. Also, similar to the above embodiment, the indicator chip may be changed to another memory chip.

According to some example embodiments shown in FIG. 14, the degree of reliability may be determined in a plurality of stages similarly as in the embodiments of FIGS. 12 and 13. For example, compared to a case where reliability deterioration information is output one time, when reliability deterioration information is output for a plurality of number of times through a change of an indicator chip, it may be determined that the reliability of the memory module 720 is further deteriorated, and a user may determine the need of replacing the memory module 720 by referring to a degree of reliability deterioration.

Although FIG. 14 shows some example embodiments in which a memory chip storing parity data is changed and an indicator chip is changed based on the change of the memory chip, example embodiment need not be limited thereto. For example, memory chips with relatively low reliability may be determined through reliability information from the memory module 720 or a testing operation or a dummy program operation by the memory controller 710, wherein a memory chip with the lowest reliability may be set as an initial indicator chip is set, and a memory chip with the second lowest reliability may be changed to an indicator chip.

On the other hand, the embodiments shown in FIG. 14 may be combined with the embodiments shown in FIGS. 12 and 13 above. For example, the N-th memory chip 721_N may include a plurality of cell blocks, and an error occurrence monitoring operation and a reliability deterioration information outputting operations may be performed for each cell block, and, after reliability deterioration information is output according to results of monitoring one or more cell blocks of the N-th memory chip 721_N, the indicator chip may be changed to the (N−1)-th memory chip 721_(N−1).

Figure 15:
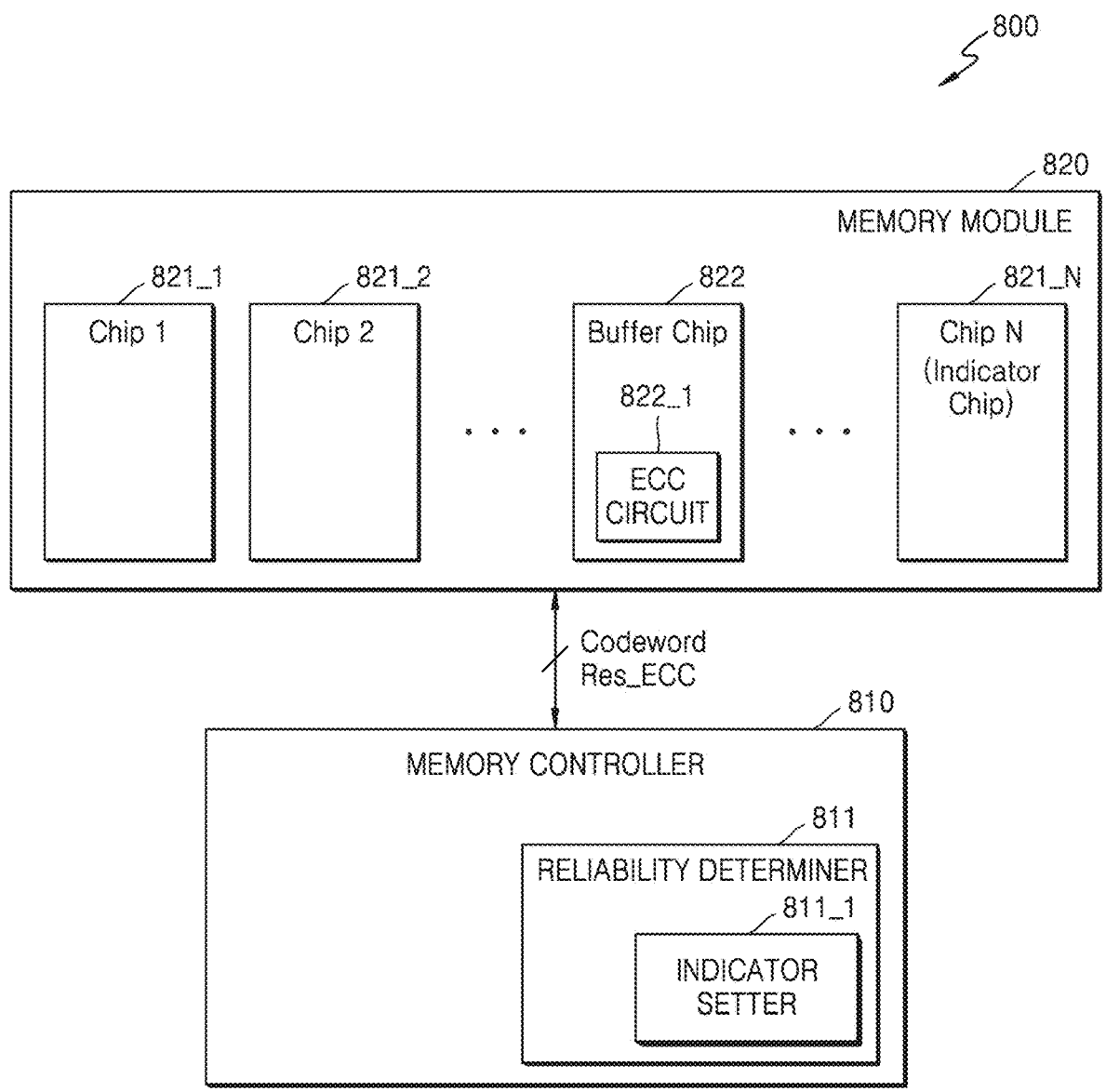
FIG. 15 is a block diagram showing a memory system according to another modified example embodiment.

FIG. 15 is a block diagram showing a memory system according to another modified example embodiment. In FIG. 15, an example in which an ECC encoding and decoding processing is performed within a memory module is shown.

Referring to FIG. 15, a memory system 800 may include a memory controller 810 and a memory module 820. The memory controller 810 may include a reliability determiner 811, and the reliability determiner 811 may include an indicator setter 811_1. In addition, the memory module 820 may include first to N-th memory chips 821_1 to 821_N and may further include a buffer chip 822 including an ECC circuit 822_1. The buffer chip 822 may be mounted on the memory module 820 to perform various functions and may include a storage circuit (not shown) for temporarily storing commands and addresses through communication with the memory controller 810. Also, the ECC circuit 822_1 of the buffer chip 822 may generate parity data using normal data from the memory controller 810 and may also generate an error detection result Res_ECC through an ECC decoding process on a codeword read out from first to N-th memory chips 821_1 to 821_N of the memory module 820.

The reliability determiner 811 may set at least one memory chip from among the first to N-th memory chips 821_1 to 821_N as an indicator chip and, upon reception of a codeword from the memory module 820, may receive the error detection result Res_ECC. The reliability determiner 811 may include information regarding a memory chip set as an indicator chip therein and may determine the location of a memory chip where an error has occurred by using the error detection result Res_ECC. In addition, the reliability determiner 811 may monitor the error occurrence frequency in the indicator chip and output reliability deterioration information according to the embodiments described above. As described above, the functionality of the memory controller 100, 310, 410, 510A, 510B, 610, 710, 810, of FIGS. 1, 3, 4, 6, 9A, 9B, 12, 14, and 15 may be implemented in the processor 110 or as a separate hardware and/or processor/software component.

Figure 16:
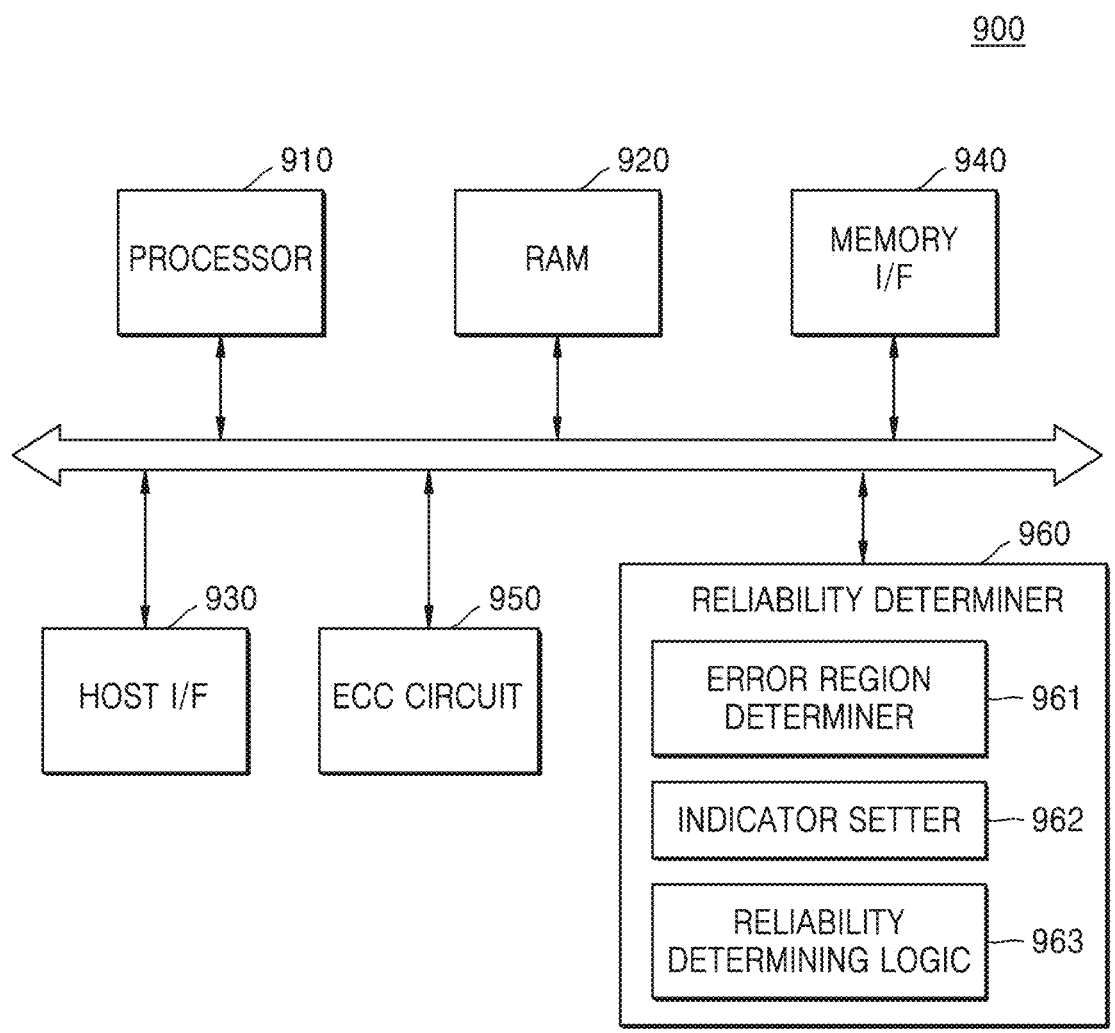
FIG. 16 is a block diagram showing an implementation of a memory controller according to an example embodiment.

FIG. 16 is a block diagram showing an implementation of a memory controller according to an example embodiment.

Referring to FIG. 16, a memory controller 900 may include a processor 910, a RAM 920, a host interface 930, a memory interface 940, an ECC circuit 950, and/or a reliability determiner 960. According to an example embodiment, the memory controller 900 may be a device included in an application processor (AP) (not shown) that may be implemented as a system-on-chip. The reliability determiner 960 may also include an indicator setter 961, an error region determiner 962, and/or a reliability determining logic 963.

The processor 910 may include a central processing unit or a microprocessor and may control all operations of the memory controller 900. For example, the processor 910 may be configured to drive software or firmware for controlling the memory controller 900, wherein the software or the firmware may be loaded into the RAM 920 and driven. The RAM 920 may be used as an operation memory, a cache memory, or a buffer memory of the processor 910. In the RAM 920, write data to be written to a memory device may be temporarily stored, and read data read from the memory device may also be temporarily stored.

The host interface 930 interfaces with a host and receive a request for a memory operation from the host. For example, the host interface 930 may receive various requests for reading and writing data from a host HOST and, in response, generate various internal signals for memory operations for a memory device.

The memory interface 940 may provide an interface between the memory controller 900 and a memory device (not shown). For example, write data and read data may be transmitted to and received from a memory device via the memory interface 940. Also, the memory interface 940 may provide a command and an address to a memory device and may also receive various information from the memory device and provide the same into the memory controller 900.

The ECC circuit 950 may perform an error detection operation according to the above-described embodiments. For example, the ECC circuit 950 may receive a codeword from a memory module including a plurality of memory chips controlled by the memory controller 900 and perform an error detection operation on the codeword. Also, an error detection result of the ECC circuit 950 may be provided to the reliability determiner 960.

The indicator setter 961 may set at least one memory chip from among a plurality of memory chips as an indicator chip according to the above-described embodiments and may also perform an operation for changing an indicator chip. In addition, the error region determiner 962 may determine a memory chip in which an error has occurred based on the error detection result, and the reliability determining logic 963 may determine whether to output reliability deterioration information based on information regarding the indicator chip and information regarding the memory chip in which an error has occurred.

Various functions that may be performed by the reliability determiner 960 may be implemented in hardware, software, or a combination of hardware and software. For example, when the setting of the indicator chip and the outputting of the reliability deterioration information are implemented in hardware, the functions may be executed by a hardware circuit disposed within the reliability determiner 960. Alternatively, when the setting of the indicator chip and the outputting of the reliability deterioration information are implemented in software, a program provided inside or outside the reliability determiner 960 may be loaded into the RAM 920 and the corresponding functions may be performed as the processor 910 executes the corresponding program. As described above, the functionality of one or more of the blocks FIG. 16 may be implemented as one or more hardware/memory and/or processor/software/memory components.

While the inventive concepts have been particularly shown and described with reference to embodiments thereof, it will be understood that various changes in form and details may be made therein without departing from the spirit and scope of the following claims.

What is claimed is:

1. A memory system comprising:
   a memory device including a plurality of memory regions; and
   a controller configured to,
      set a memory region having a relatively low reliability among the plurality of memory regions as an indicator based on a bit error rate of data read from each of the plurality of memory regions,
      receive first data stored in a first memory region of the memory device,
      receive second data stored in the indicator of the memory device,
      monitor a frequency of an error occurrence in the first data and a frequency of an error occurrence in the second data based on an error detection, and
      output reliability deterioration information indicating that reliability of the memory device is deteriorated when the frequency of the error occurrence in the second data exceeds the frequency of the error occurrence in the first data.

2. The memory system of claim 1, wherein the controller includes an error correction code (ECC) circuit configured to perform the error detection on data read from the memory device.

3. The memory system of claim 1, wherein the controller is further configured to receive a plurality of data including the first data and the second data as a codeword.

4. The memory system of claim 1, wherein the controller is further configured to set a second memory region as the indicator after the reliability deterioration information is output.

5. The memory system of claim 4, wherein the second memory region has a second lowest reliability among the plurality of memory regions.

6. The memory system of claim 4, wherein the first memory region is included in a first chip and the second memory region is included in a second chip different from the first chip.

7. The memory system of claim 4, wherein the first memory region and the second memory region are included in a same chip.

8. A method of operating a memory controller configured to control a memory operation of a memory device comprising a plurality of memory chips, the method comprising:
setting a memory chip having a relatively low reliability among the plurality of memory chips as an indicator chip based on a bit error rate of data read from each of the plurality of memory chips;
receiving first data stored in a first memory chip of the memory device;
outputting error correction result for the first data based on an error detection;
receiving second data stored in the indicator chip of the memory device;
monitor a frequency of an error occurrence in the indicator chip and a frequency of an error occurrence in the first memory chip based on an error detection; and
outputting reliability deterioration information indicating that reliability of the memory device is deteriorated when the frequency of the error occurrence in the indicator chip exceeds the frequency of the error occurrence in the first memory chip.

9. The method of claim 8, further comprising:
comparing an error for the first data with an error for the second data based on the error detection,
wherein the outputting further includes outputting the reliability deterioration information in response to a comparison result indicating that the frequency of the error occurrence in the indicator chip exceeds the frequency of the error occurrence in the first memory chip.

10. The method of claim 8, wherein the memory controller is configured to receive a plurality of data including the first data and the second data as a codeword,
wherein an error for the first data is corrected based on an error correction on the codeword.

11. The method of claim 8, further comprising:
setting a second memory chip as the indicator chip after the reliability deterioration information is output.

12. The method of claim 11, further comprising:
receiving third data stored in the second memory chip set as the indicator chip; and
outputting another reliability deterioration information indicating that reliability of the memory device is deteriorated based on the error detection on the third data.

13. The method of claim 8, further comprising:
setting a second memory chip having a second lowest reliability among the plurality of memory chips as the indicator chip after the reliability deterioration information is output.

14. A method of operating a memory controller configured to control a memory operation of a memory device comprising a plurality of memory chips, the method comprising:
setting one memory chip having a relatively low reliability among the plurality of memory chips as an indicator chip based on a bit error rate of data read from each of the plurality of memory chips;
receiving a plurality of data stored in the plurality of memory chips of the memory device as a single codeword;
performing an error detection on the single codeword to obtain information regarding an error occurrence in each of the plurality of memory chips;
monitor a frequency of an error occurrence in the indicator chip at a reliability determination timing; and
outputting reliability deterioration information indicating that reliability of the memory device is deteriorated when the frequency of the error occurrence in one of the memory chips corresponds to the frequency of the error occurrence in the indicator chip.

15. The method of claim 14, further comprising:
outputting error corrected data when one of the memory chips in which the error has occurred corresponds to a memory chip different from the indicator chip.

* * * * *